US012547432B1

(12) United States Patent
Lozada et al.

(10) Patent No.: US 12,547,432 B1
(45) Date of Patent: Feb. 10, 2026

(54) SYSTEMS AND METHODS OF TRANSFERRING USER INTERACTION BETWEEN TWO COMPUTER SYSTEMS

(71) Applicant: Apple Inc., Cupertino, CA (US)

(72) Inventors: Richard P. Lozada, Cupertino, CA (US); Peter Burgner, Venice, CA (US); Thomas J. Moore, Northglenn, CO (US); Paul Ewers, San Jose, CA (US); Lee Sparks, Lake Forest, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 18/394,823

(22) Filed: Dec. 22, 2023

Related U.S. Application Data

(60) Provisional application No. 63/477,310, filed on Dec. 27, 2022.

(51) Int. Cl.
*G06F 9/451* (2018.01)
*G06F 3/01* (2006.01)

(52) U.S. Cl.
CPC .............. *G06F 9/451* (2018.02); *G06F 3/013* (2013.01)

(58) Field of Classification Search
CPC ................................ G06F 9/451; G06F 3/013
See application file for complete search history.

(56) References Cited

U.S. PATENT DOCUMENTS

| 8,730,156 B2 | 5/2014 | Weising et al. |
| 9,619,105 B1 | 4/2017 | Dal Mutto |
| 9,870,130 B2 | 1/2018 | Schubert et al. |
| 10,564,714 B2 | 2/2020 | Marggraff et al. |
| 10,708,965 B1 | 7/2020 | Subramanian et al. |
| 11,176,755 B1 | 11/2021 | Tichenor et al. |
| 11,243,734 B2 | 2/2022 | Boissière et al. |
| 11,379,033 B2 | 7/2022 | O'hern et al. |
| 2014/0002444 A1 | 1/2014 | Bennett et al. |
| 2014/0298273 A1 | 10/2014 | Blackstone et al. |
| 2015/0193982 A1 | 7/2015 | Mihelich et al. |

(Continued)

FOREIGN PATENT DOCUMENTS

| EP | 2458486 A1 | 5/2012 |
| WO | 2021/061349 A1 | 4/2021 |

(Continued)

OTHER PUBLICATIONS

International Search Report received for PCT Patent Application No. PCT/US2023/074968, mailed on Feb. 26, 2024, 7 pages.

(Continued)

*Primary Examiner* — Tadesse Hailu
(74) *Attorney, Agent, or Firm* — Kubota & Basol LLP

(57) ABSTRACT

Methods for transitioning from a first user interface that corresponds to a first session of a first computer system to a second user interface of a second computer system in response to a change in contextual information. In some embodiments, the change in contextual information includes a first change in a relative pose between the second computer system and a reference point corresponding to the first computer system. In some embodiments, the second user interface corresponds to a second session of the first application operating on the second computer system based at least in part on the first session of the first application.

24 Claims, 14 Drawing Sheets

(56) References Cited

U.S. PATENT DOCUMENTS

| | | |
|---|---|---|
| 2015/0205106 A1 | 7/2015 | Norden |
| 2016/0025971 A1 | 1/2016 | Crow et al. |
| 2016/0370858 A1 | 12/2016 | LeppÄnen et al. |
| 2017/0090566 A1 | 3/2017 | George-svahn et al. |
| 2017/0115728 A1 | 4/2017 | Park et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2018/0300952 A1 | 10/2018 | Evans et al. |
| 2018/0350119 A1 | 12/2018 | Kocharlakota et al. |
| 2019/0279407 A1 | 9/2019 | Mchugh et al. |
| 2019/0302977 A1 | 10/2019 | Pendergast et al. |
| 2019/0369569 A1 | 12/2019 | Olsen et al. |
| 2019/0384406 A1 | 12/2019 | Smith et al. |
| 2020/0051527 A1 | 2/2020 | Ngo |
| 2020/0257484 A1 | 8/2020 | Qian et al. |
| 2020/0319704 A1 | 10/2020 | Kathuria et al. |
| 2020/0328913 A1 | 10/2020 | Wyas et al. |
| 2021/0011556 A1 | 1/2021 | Atlas et al. |
| 2021/0055789 A1 | 2/2021 | Tsai et al. |
| 2021/0067418 A1 | 3/2021 | Ely et al. |
| 2021/0096726 A1 | 4/2021 | Faulkner et al. |
| 2021/0173536 A1 | 6/2021 | Kondo |
| 2021/0191600 A1 | 6/2021 | Lemay et al. |
| 2021/0227601 A1 | 7/2021 | Eom et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0358294 A1 | 11/2021 | Parashar et al. |
| 2021/0366440 A1 | 11/2021 | Burns et al. |
| 2021/0400744 A1 | 12/2021 | Chen et al. |
| 2021/0405760 A1 | 12/2021 | Schoen |
| 2022/0124286 A1 | 4/2022 | Punwani et al. |
| 2022/0239718 A1 | 7/2022 | Song et al. |
| 2022/0244536 A1 | 8/2022 | Sha et al. |
| 2022/0253125 A1 | 8/2022 | Wallen et al. |
| 2022/0287676 A1 | 9/2022 | Steines et al. |
| 2022/0291808 A1 | 9/2022 | Stevens et al. |
| 2022/0303680 A1 | 9/2022 | Ahmed et al. |
| 2023/0176806 A1 | 6/2023 | Chen et al. |
| 2023/0206572 A1 | 6/2023 | Pazmino et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2024/0103685 A1 | 3/2024 | Pazmino et al. |
| 2024/0103686 A1 | 3/2024 | Pazmino et al. |
| 2024/0104870 A1 | 3/2024 | Fuste Lleixa et al. |
| 2024/0104873 A1* | 3/2024 | Pastrana Vicente .. G06F 3/0482 |
| 2024/0104877 A1* | 3/2024 | Henderson ............ G06T 15/506 |
| 2024/0152245 A1* | 5/2024 | Broughton .............. G06F 3/013 |
| 2024/0203066 A1 | 6/2024 | Kawashima et al. |
| 2024/0233288 A1 | 7/2024 | Stauber et al. |
| 2024/0273838 A1 | 8/2024 | Palangie et al. |
| 2025/0278907 A1 | 9/2025 | Pazmino et al. |

FOREIGN PATENT DOCUMENTS

| | | |
|---|---|---|
| WO | 2022/055821 A1 | 3/2022 |
| WO | 2022/067343 A2 | 3/2022 |

OTHER PUBLICATIONS

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074957, mailed on Jan. 30, 2024, 7 pages.

Non-Final Office Action received for U.S. Appl. No. 18/429,301, mailed on Jun. 12, 2024, 28 pages.

Notice of Allowance received for U.S. Appl. No. 18/429,294, mailed on Jun. 21, 2024, 10 pages.

How to Use Your Phone or Tablet in VR! | iOS and Android, YouTube [online]. YouTube, Dec. 20, 2017, Available online at <https://www.youtube.com/watch?v=QhfZjbVUxZE >, [Retrieved from Internet on Dec. 23, 2022], 4 pages.

Your PC in VR, Virtual Desktop [online], Virtual Desktop, Inc., 2023 [retrieved on Apr. 17, 2024], Retrieved from the Internet: < URL: https://www.vrdesktop.net/>, 4 pages.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Didehkhorshid et al., "Text Input in Virtual Reality Using a Tracked Drawing Tablet", HCII 2020, LNCS 12428, 2020, pp. 314-329.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxl>, 2 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Nov. 18, 2025], 2 pages.

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 18, 2025], 2 pages.

Drawing and painting in VR by using a graphics tablet as virtual paper, Reddit [online]. Reddit, Aug. 1, 2012. Available online at <https://www.reddit.com/r/oculus/comments/1wsdlv/drawing_and_painting_in_vr_by_using_a_graphics/>, [Retrieved from Internet on Nov. 18, 2025], 6 pages.

* cited by examiner

600

602a — While the first computer system is in communication with a second computer system, different from the first computer system, and while displaying, via the display, a first user interface that corresponds to a first session of a first application operating on the first computer system:

602b — Detecting, via the one or more input devices, a change in contextual information, wherein the change in contextual information includes a first change in a relative pose between the second computer system and a reference point

602c — In response to detecting the change in contextual information:

602d — In accordance with a determination that one or more criteria are satisfied:

602e — Causing the second computer system to display a second user interface that corresponds to a second session of the first application operating on the second computer system based at least in part on the first session of the first application

602f — In accordance with a determination that the one or more criteria are not satisfied, forgoing causing the second computer system to display the second user interface of the first application

FIG. 6

SYSTEMS AND METHODS OF TRANSFERRING USER INTERACTION BETWEEN TWO COMPUTER SYSTEMS

CROSS-REFERENCE TO RELATED APPLICATIONS

This application claims benefit of U.S. Provisional Application No. 63/477,310, filed Dec. 27, 2022, the entire disclosure of which is herein incorporated by reference for all purposes.

FIELD OF THE DISCLOSURE

This relates generally to systems and methods of transferring user interaction between two computer systems, and more specifically to systems and methods for invoking an application for operation on a second computer system while the application is operating on a first computer system in response to detecting a change in contextual information.

BACKGROUND OF THE DISCLOSURE

Computer systems can command the way content is delivered and a user can elect to use one computer system over another computer system. However, transitioning from using a first computer system to a second computer system may require a number of user inputs such as, launching the application on the second computer system, going through an authentication process, navigating to the particular user interface, and navigating to a particular content item that is based on a session of the application operating on the first computer system.

SUMMARY OF THE DISCLOSURE

Some embodiments described in this disclosure are directed to systems and methods of while operating an application on a first computer system, invoking the application for operation on a second computer system in response to a change in contextual information. In particular, in some embodiments, the systems and methods can create an improved user experience in which a user can operate their devices interchangeably without interrupting the session or process of the application they are using. Some embodiments described in this disclosure are directed to systems and methods of detecting a change in contextual information causing the display (or update) of a respective user interface in various computer systems. Causing the second computer system to display a respective user interface based on another user interface displayed on the first computer system in response to detecting a change in contextual information (e.g., in anticipation of the user operating the second computer system) permits the user to transition from operating the first computer system to operating the second computer system quickly and seamlessly without requiring additional user input, thereby improving user interaction. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 6 is a flow diagram illustrating a method of transitioning from a first user interface of a first computer system to a second user interface of a second computer system in response to a change in contextual information in accordance with some embodiments of the disclosure.

DETAILED DESCRIPTION

In the following description of embodiments, reference is made to the accompanying drawings which form a part hereof, and in which it is shown by way of illustration specific embodiments that are optionally practiced. It is to be understood that other embodiments are optionally used, and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective representation could be referred to as a "first" or "second" representation, without implying that the respective representation has different characteristics based merely on the fact that the respective representation is referred to as a "first" or "second" representation. On the other hand, a representation referred to as a "first" representation and a representation referred to as a "second" representation are both representation, but are not the same representation, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
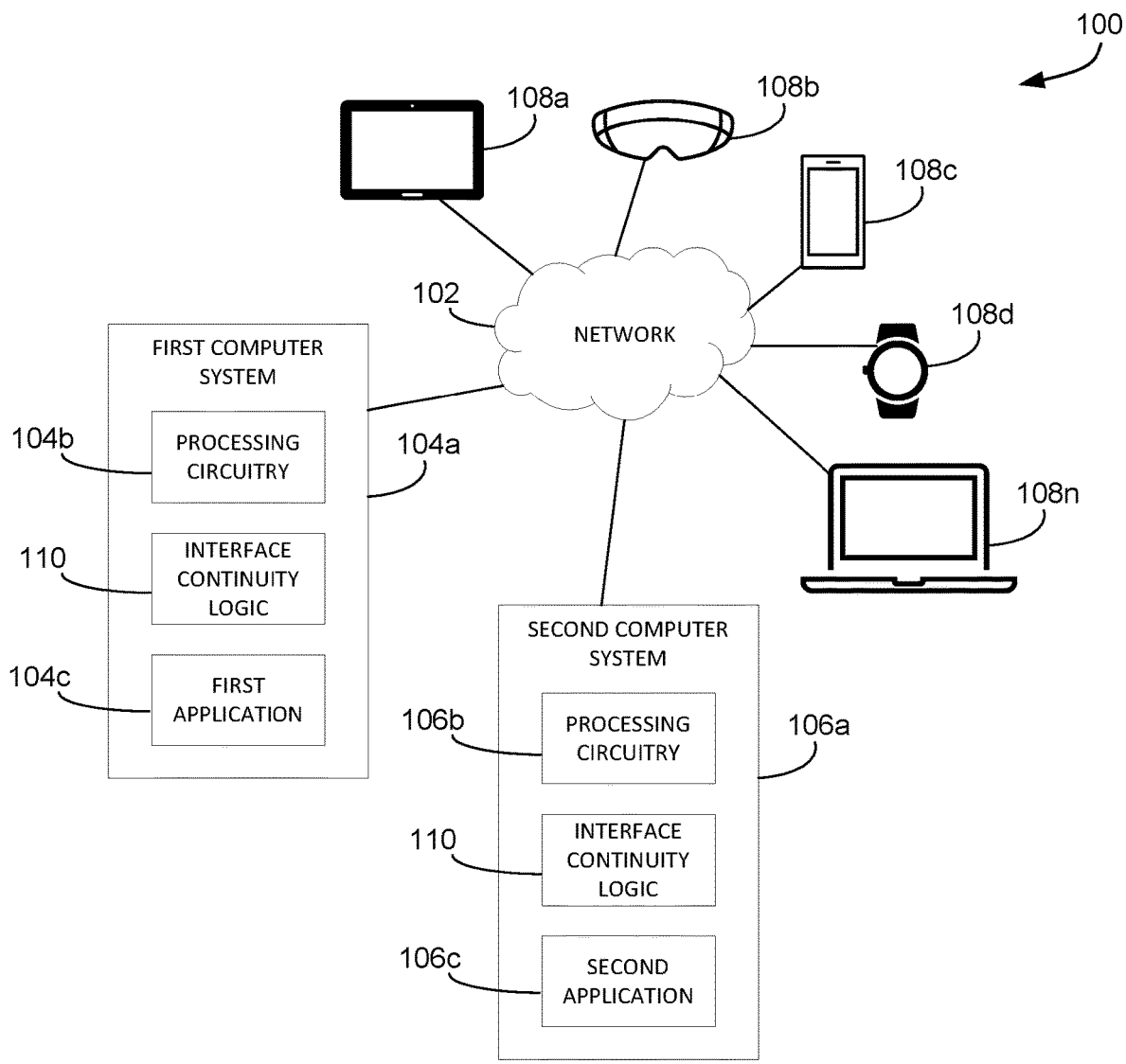
FIG. 1 illustrates a computer system according to some embodiments of the disclosure.

FIG. 1 illustrates a computer system 100 according to some embodiments of the disclosure. For example, FIG. 1 shows system 100 including an example network architecture for a system, which may include one or more devices, and sub-systems that are configured to implement some embodiments discussed herein. In some embodiments, the computer system 100 environment includes one or more computer systems (e.g., first computer system 104a, second computer system 106a, and computer systems 108a-108n), which may be associated with one or more users. In some embodiments, the one or more computer systems may be communicatively coupled to one or more communications networks (e.g., network 102), which can include any type of wired or wireless network, such as the Internet, a cellular network, a Wi-Fi network, a local area network (LAN), a wide area network (WAN), or the like. In some embodiments, each of the computer systems may be in electronic communication with, for example, one another over the same or different wireless or wired networks as discussed herein.

In some embodiments, the one or more computer systems (e.g., first computer system 104a and second computer system 106a) may include hardware and/or software applications (e.g., application 104c and application 106c) running thereon for implementing the disclosed embodiments. For example, the one or more computer systems may execute an operating system to interact with applications 104c and application 106c. Such apps are typically designed to execute on mobile devices, such as tablets, smartphone, and/or wearable devices. In some embodiments, the first application 104c operates on a compiled code base or repository that is separate and distinct from that which supports the second application 106c. In some embodiments, the first application 104c and the second application 106c may reside on the same computer system or reside on different computer systems that communication over network 102. In some embodiments, the first application 104c and the second application 106c are the same application operating on two different devices (e.g., e.g., first computer system 104a and second computer system 106a).

In some embodiments, the first computer system 104a and second computer system 106a can be implemented with hardware and/or software instructions to perform one or more methods or processes, such as described with reference to FIG. 6. In some embodiments, the first computer system 104a and second computer system 106a may include processing circuitry (e.g., processing circuitry 104b and processing circuitry 106b). In some embodiments, the processing circuitry can include one or more processors (e.g., processor 204). One or more of the processors can include a digital signal processor (DSP), a microprocessor, a central processing unit (CPU), a programmable logic device (PLD), a field programmable logic array (FPGA), a graphical processing unit (GPU), and/or the like. In some embodiments, the first computer system 104a and second computer system 106a may include interface continuity logic 110 configured to facilitate user interaction with the first application 104c operating on the first computer system 104a and the second application 106c operating on the second computer system 106a. In some embodiments, the interface continuity logic 110 comprises hardware (such as, circuit, special logic etc.) and/or software (software such as, general-purpose computing system or custom-built machine run). In some embodiments, the interface continuity logic includes data and instructions that are executed by processing circuitry (e.g., processing circuitry 104b and processing circuitry 106b). For example, processing circuitry 104b and processing circuitry 106b are configured to execute computer coded instructions provided by the interface continuity logic 110. In some embodiments, the interface continuity logic 110 is configured to support a plurality of communication interfaces (e.g., graphical user interfaces and/or input interfaces) operating on respective computer systems. The interface continuity logic 110 manages communications between users of the one or more computer systems and its applications. In some embodiments, the interface continuity logic 110 is configured to provide seamless continuity from the first application 104c operating on the first computer 104a to the second application 106c operating on the second computer system 106a, different from the first computer system, as will described in more detail herein.

In some embodiments, the first computer system 104a is a head-mounted device (e.g., device 108b) and the second computer system 106a is a smartphone (e.g., device 108c). In some embodiments, the second computer system 106a is any of the devices (e.g., 108a-108n) other than the head-mounted device 108b). In some embodiments, the first application 104c of the first computer system 104a and the second application 106c of the second application 106c are the same application but may include different user interfaces based on the device. For example, a first user interface that corresponds to a first session of the first application 104c may include a first set of affordances (e.g., virtual objects or user interface objects) in a first display layout. In some embodiments, the second computer system 106a displays a second user interface that corresponds to a second session of the second application 106c that is based at least in part on the first session of the first application 104c operating on the first computer system 104a. For example, the second user interface optionally includes a second set of affordances different from the first set of affordances as described and illustrated with reference to FIGS. 5A-5I.

In some embodiments, providing seamless continuity from the first application 104c operating on the first computer system 104a to the second application 106c operating on the second computer system 106a includes detecting contextual information associated with the first computer system 104a and/or the second computer system 106a. In some embodiments, the contextual information is processed and analyzed to determine whether the detected contextual information satisfies one or more criteria related to causing display of a respective user interface. For example, display of the second user interface on the second computer system 106a may be triggered in response to detecting that the user's attention (e.g., eye gaze) is directed toward the second computer system 106a. More examples and details related to conditions for triggering the display of user interfaces in respective computer systems will be described in more detail with reference to FIGS. 3 and 4. In some embodiments, the first computer system 104a and second computer system 106a may communicate, via network 102, the detected contextual information with one or more other modules, devices, or components (e.g., devices 108a-108n) in order to determine whether the one or more criteria related to causing to display a respective user interface on a respective computer system as described herein.

In some embodiments, the one or more computer systems include one or more sensors such as motion sensors (e.g., pedometer, accelerometer, or gyroscope) that can measure the motion of the one or more computer systems. In some embodiments, the one or more computer systems include one or more input devices (e.g., a gaze tracking device, a hand tracking device, a remote control, one or more sensitive-surface, one or more buttons, dials, and/or knobs). In some embodiments, the gaze tracking device is a wearable device, such as a head-mounted device (e.g., device 108b). In some embodiments, the gaze tracking device need not be implemented in a head-mounted device or otherwise near-eye fashion as has been described herein. In some embodiments, the contextual information includes the user's gaze using the gaze tracking device of the one or more computer systems. In some embodiments, the computer system is a mobile device such as tablet device (e.g., 108a), a smartphone (e.g., 108c), a wearable device (e.g., 108d), or a laptop (e.g., 108n), or another device.

Figure 2:
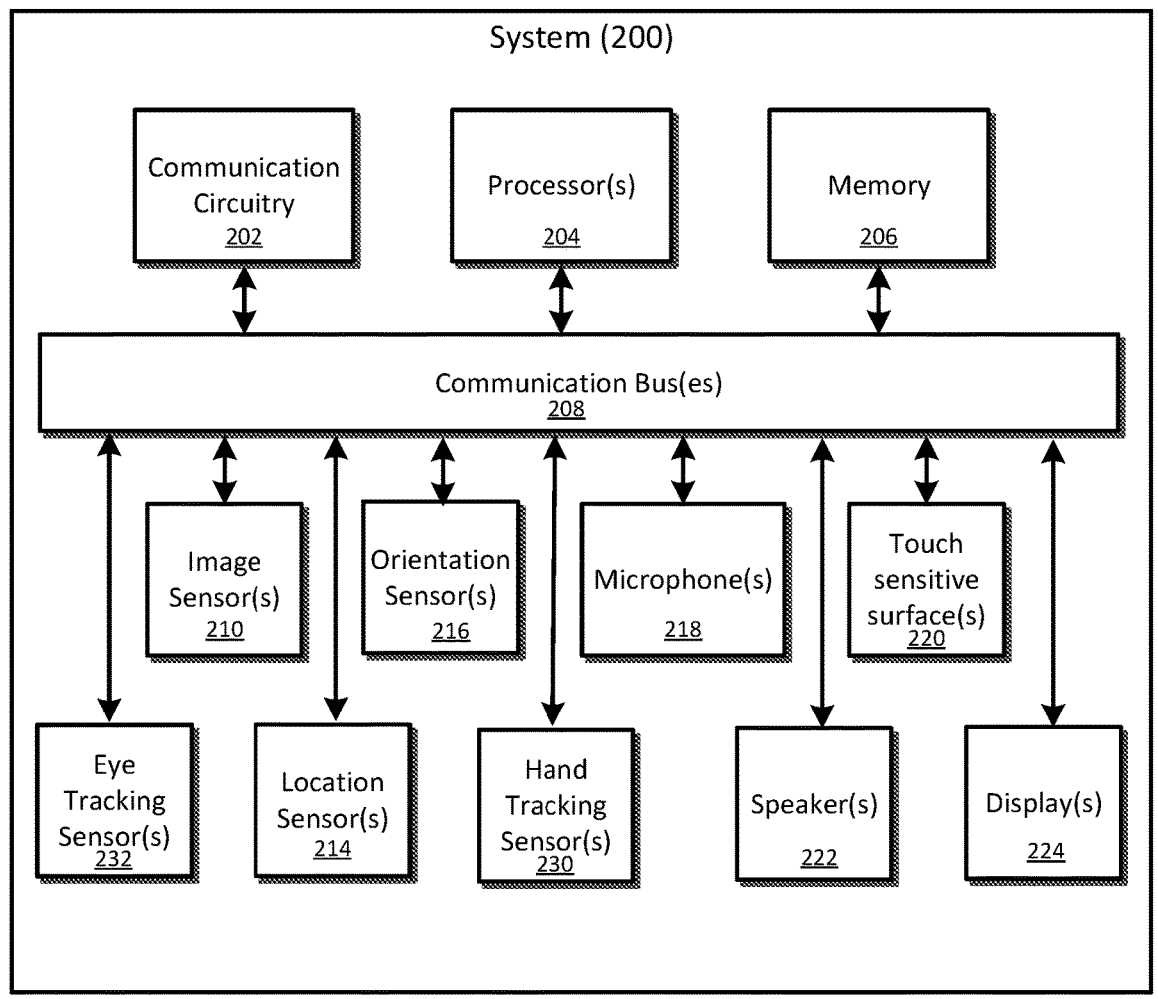
FIG. 2 illustrates a block diagram of an exemplary architecture for a device in accordance with some embodiments of the disclosure.

FIG. 2 illustrates a block diagram of an exemplary architecture for a device 200, such as computer system 104a, 106a, or 108a-108n, in accordance with some embodiments of the disclosure. The blocks in FIG. 2 can represent an information processing apparatus for use in the device. In some embodiments, device 200 is a mobile device, such as a mobile phone (e.g., smart phone device 108c), a tablet computer (e.g., 108a), a laptop computer (e.g., 108n), a desktop computer, a wearable device (e.g., 108d), a head-mounted display (e.g., device 108b), an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions (e.g., programs) configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 210 include a first image sensor and a second image sensor. The first image sensor and the second image sensor work in tandem and are optionally configured to capture different information of physical objects in the real-world environment. In some embodiments, the first image sensor is a visible light image sensor, and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the computer-generated environment, relative to the display generation component(s) 224, and/or relative to another defined coordinate system. Eye tracking sensor(s) 232 are configured to track the position and movement of a user's gaze (eyes, face, or head, more generally) with respect to the real-world or computer-generated environment and/or relative to the display generation component(s) 224. In some embodiments, hand tracking sensor(s) 230 and/or eye tracking sensor(s) 232 are implemented together with the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s). In some embodiments, eye tracking sensor(s) 232 can use image sensor(s) 210 (e.g., one or more IR cameras, 3D cameras, depth cameras, etc.).

Device 200 is not limited to the components and configuration of FIG. 2, but can include fewer, other, or additional components in multiple configurations. A person using device 200, is optionally referred to herein as a user of the device.

As described herein, a computer-generated environment including various graphics user interfaces ("GUIs") may be displayed using an electronic device, such as computer system 100 or device 200, including one or more display generation components. The computer-generated environment can include one or more GUIs associated with an application.

In some embodiments, locations in a computer-generated environment (e.g., a three-dimensional environment, an XR environment, a mixed reality environment, etc.) optionally have corresponding locations in the physical environment. Thus, when a device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a user interface located in front of the table, with the table being a view of (or a representation of) a physical table in the physical environment, and the user interface being a virtual object.

Similarly, a user is optionally able to interact with virtual objects in the three-dimensional environment (e.g., such as user interfaces of applications running on the device) using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment (e.g., grabbing, moving, touching, pointing at virtual objects, etc.) as if they were real physical objects in the physical environment. In some embodiments, a user is able to move his or her hands to cause the representations of the hands in the three-dimensional environment to move in conjunction with the movement of the user's hand. As used herein, reference to a physical object such as hand can refer to either a representation of that physical object presented on a display, or the physical object itself as passively provided by a transparent or translucent display.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user can be located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

Some embodiments described herein may refer to selection inputs as either discrete inputs or as continuous inputs. For example, a selection input can correspond to a single selection input or a selection input can be held (e.g., maintained) while performing one or more other gestures or inputs. In some embodiments, a selection input can have an initiation stage, a holding stage, and a termination stage. For example, in some embodiments, a pinch gesture by a hand of the user can be interpreted as a selection input. In this example, the motion of the hand into a pinch position can be referred to as the initiation stage and the device is able to detect that the user has initiated a selection input. The holding stage refers to the stage at which the hand maintains the pinch position. Lastly, the termination stage refers to the motion of the hand terminating the pinch position (e.g., releasing the pinch). In some embodiments, if the holding stage is less than a predetermined threshold amount of time (e.g., less than 0.1 seconds, 0.3 seconds, 0.5 seconds, 1 second, 2 seconds, etc.), then the selection input is interpreted as a discrete selection input (e.g., a single event actuating a respective user interface element), such as a mouse click-and-release, a keyboard button press-and-release, etc. In such embodiments, the electronic device optionally reacts to the discrete selection event (e.g., optionally after detecting the termination). In some embodiments, if the holding stage is more than the predetermined threshold amount of time, then the selection input is interpreted as a select-and-hold input, such as a mouse click-and-hold, a keyboard button press-and-hold, etc. In such embodiments, the electronic device can react to not only the initiation of the selection input (e.g., initiation stage), but also to any gestures or events detected during the holding stage (e.g., such as the movement of the hand that is performing the selection gesture), and/or the termination of the selection input (e.g., termination stage).

In some embodiments, the first computer system 104a can detect a change in contextual information indicative of transferring user interaction from the first computer system 104a to the second computer system 106a. In some embodiments, contextual information may be obtained from the first computer system 104a and/or one or more computer systems communicatively connected to the first computer system 104a (e.g., second computer system 106a). In some embodiments, the first computer system 104a utilizes one or more sensors to detect contextual information associated with the second computer system 106a, such as for example, using a camera to detect a change in the pose of the second computer system 106a as described herein. In some embodiments, the first computer system 104a can receive or fetch contextual information comprising accelerometer data or other data from one or more sensors of the second computer system 106.

Figure 3:
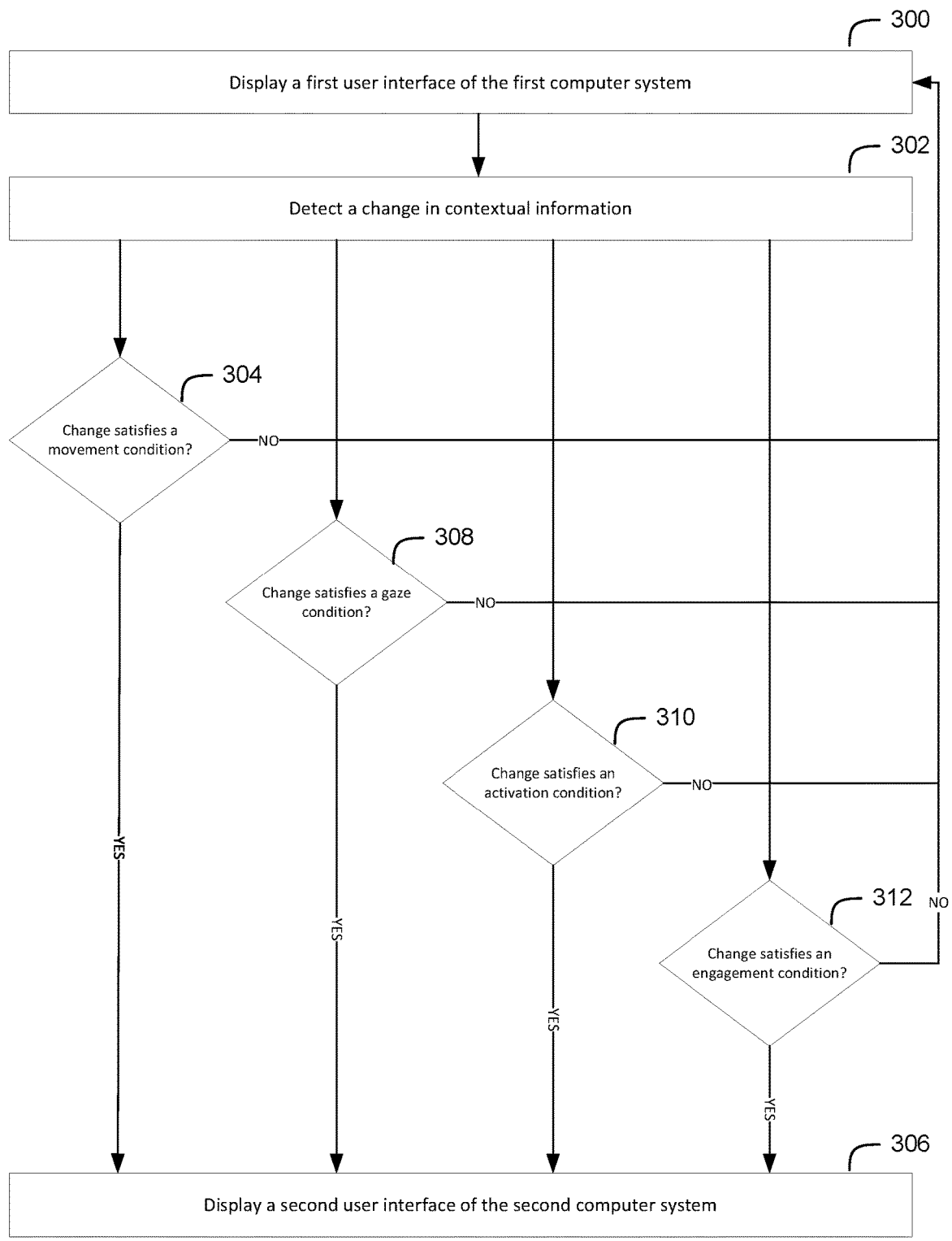
FIGS. 3 and 4 illustrate logic flows including contextual information processing logic used with some embodiments of the disclosure.

In some embodiments, after obtaining the contextual information, the first computer system 104a determines whether the contextual information satisfies one or more conditions for transferring user interaction from the first computer system 104a to the second computer system 106a. The one or more conditions are described in FIG. 3. FIG. 3 illustrates a logic flow including contextual information processing logic used with some embodiments, and operations that are performed by processing circuitry 104b including interface continuity logic 110. For example, the logic flows illustrated in FIG. 3 may be implemented in the first computer system 104a. As shown in FIG. 3, the first computer system 104a is configured to display, at operation 300, a first user interface of the first computer system (e.g., first computer system 104a), such as the first user interface (e.g., virtual object 514) of the first computer system 500 illustrated in FIG. 5B. Returning to FIG. 3, the first computer system 104a may detect, at operation 302, a change in contextual information. The first computer system 104a may implement interface continuity logic to determine whether the change satisfies various conditions. For example, first computer system 104a may implement interface continuity logic to determine whether the change satisfies a movement condition at operation 304 indicative of user engagement with the second computer system. In some embodiments, the movement condition may suggest displaying, at operation 306, a second user interface of the second computer system (e.g., second computer system 106a), such as the second user interface 526 of the second computer system 518 illustrated in FIG. 5C. In some embodiments, the movement condition may suggest ceasing to display, by the first computer system, the first user interface. In some embodiments, a change in a relative pose between the second computer system, such as the second computer system 518 in FIG. 5B, and a reference point, such as the user's head when wearing the first computer system, may cause the second computer system to display the second user interface. In some embodiments, the first computer system may track the position/ location of the first computer system and/or the second computer system with respect to the environment. For example, the change in the relative pose includes movement of the head of the user by a predetermined angle towards the second computer system and/or in the same direction of the second computer system. In some embodiments, the change in the relative pose includes movement of the second computer system from a first pose to a second pose. For example, the first pose can correspond to the second computer system laying on a surface of a physical table, such as second computer system 518 laying on top of table 516 shown in FIG. 5A. Movement of the second computer system from the first pose to the second pose optionally includes the user lifting the second computer system 518 such that the second pose corresponds to the second computer system in a position other than a position of laying on the surface of a physical table, such as hand 520 holding second computer system 518 in FIG. 5C (e.g., such that the display of the second computer system faces the user). In another example, the first pose optionally corresponds to the second computer system laying face down on a surface of a physical table, such as second computer system 518 laying on top of table 516 shown in FIG. 5A. Movement of the second computer system from the first pose to the second pose optionally includes the user moving the second computer system 518 such that the second pose corresponds to the second computer system in a position laying face up on the surface of a physical table where the display of the second computer system 518 can be seen by the user.

In some embodiments, when the first computer system 104a determines that the change does not satisfy the movement condition at operation 304 (e.g., indicating that the movement condition does not suggest displaying, at operation 306, the second user interface of the second computer system), the first computer system proceeds to operation 300 and is configured to continue to display the first user interface of the first computer system.

In some embodiments, the first computer system 104a may determine whether the change satisfies a gaze condition at operation 308. In some embodiments, the gaze condition may suggest displaying, at operation 306, a second user interface of the second computer system (e.g., second computer system 106a), such as the second user interface 526 of the second computer system 518 illustrated in FIG. 5C. In some embodiments, a detection of an attention (e.g., gaze) of a user of the first computer system directed toward the second computer system may cause the second computer system to display the second user interface. For example, a determination that the attention of the user of the first computer is directed toward the second computer system for a period of time greater than a threshold period of time (e.g., 0.5, 1, 3, 5, 7, 10 seconds). In some embodiments, the first computer system detects that the attention of the user is directed to the display of the second computer system for a period of time greater than the threshold period of time. In some embodiments, when the first computer system 104 determines that the change does not satisfy the gaze condition at operation 308 (e.g., indicating that the gaze condition does not suggest causing to display, at operation 306, the second user interface of the second computer system), the first computer system proceeds to operation 300 and is configured to display the first user interface of the first computer system.

In some embodiments, the first computer system 104a may determine whether the change satisfies an activation condition at operation 310. In some embodiments, the activation condition may suggest displaying, at operation 306, a second user interface of the second computer system (e.g., second computer system 106a), such as the second user interface 526 of the second computer system 518 illustrated in FIG. 5C. In some embodiments, a detection of an activation input at the second computer system (e.g., user input confirming intent to interact with and/or perform an operation associated with the second computer system) may cause the second computer system to display the second user interface. For example, an activation input includes touch screen or trackpad inputs (e.g., finger touching the touch screen of the computer system and/or a trackpad associated with the computer system) or an input device input (e.g., selection via a handheld input device, such as a stylus or remote control). In some embodiments, the activation input is an attention-only and/or gaze-only input (e.g., not including input from one or more portions of the user other than those portions providing the attention input/gaze input). In some embodiments, when the first computer system 104a determines that the change does not satisfy the activation condition at operation 310 (e.g., indicating that the activation condition does not suggest causing to display, at operation 306, the second user interface of the second computer system), the first computer system proceeds to operation 300 and is configured to display the first user interface of the first computer system.

In some embodiments, the first computer system 104a may determine whether the change satisfies an engagement condition at operation 312. In some embodiments, the engagement condition may suggest displaying, at operation 306, a second user interface of the second computer system (e.g., second computer system 106a), such as the second user interface 526 of the second computer system 518 illustrated in FIG. 5C. For example, the engagement condition may require that user interaction does not indicate engagement with a third application on the second computer system other than the first application. In some embodiments, the engagement condition is satisfied when user interaction indicates lack of engagement with the third application, different than the first application. In some embodiments, the engagement condition is satisfied when user interaction indicates engagement with the first application operating on the second computer system. In some embodiments, causing the second computer system to display the second user interface is performed without requiring re-authentication of the user to the second computer system after determining that one or more criteria are satisfied. In some embodiments, the first computer system may have previously registered the second computer system as an authenticated device such that the second computer system may be automatically unlocked. In some embodiments, if the second computer system is registered as an authenticated device and the second computer system is physically proximate to the first computer system, the first computer system recognizes the second computer system as an authenticated computer system for purposes of bypassing user authentication on the second computer system. In some embodiments, the second computer system does not require re-authentication of the user to the second computer system if the second computer system determines that the user's credentials previously entered and authenticated via the first computer system has not expired. In some embodiments, after displaying the second user interface on the second computer system, a timeout period (e.g., 1, 3, 5, 10, or 15 seconds) is initiated, and in accordance with a determination that the second computer system does not detect engagement with the second user interface, the second computer system ceases to display the second user interface. In some embodiments, in accordance with a determination that the electronic device does not detect engagement with the second user interface, the second computer system ceases to display the second user interface and the second computer system causes to display the first user interface on the first computer system.

In some embodiments, when the first computer system 104a determines that the change does not satisfy the engagement condition at operation 312 (e.g., indicating that the engagement condition does not suggest displaying, at operation 306, the second user interface of the second computer system), the first computer system returns to operation 300 and is configured to display the first user interface of the first computer system.

It should be appreciated that, in some embodiments, the first computer system may determine whether the change in contextual information satisfies a combination of some or all of the conditions described in FIG. 3. For example, the first computer system may transfer user interaction from the first computer system to the second computer system in accordance with a determination that the user's head, equipped with the first computer system, is directed toward the second computer system and the user's gaze is directed toward the display of the second computer system for a period of time greater than the threshold period of time as described with reference to FIG. 3. In another example, the first computer system may transfer user interaction from the first computer system to the second computer system in accordance with a determination that the user's gaze is directed toward the display of the second computer system for a period of time greater than the threshold period of time and that user interaction does not indicate engagement with another application on the second computer system, different from the application on the first computer system as described with reference to FIG. 3.

In some embodiments, the first computer system may determine that the change in contextual information satisfies the movement condition (e.g., the user's head, equipped with the first computer system, is directed toward the second computer system) indicating that the movement condition suggests displaying the second user interface of the second computer system, but the first computer system determines that the contextual information does not satisfy the gaze condition (e.g., the user's gaze is directed away from the second computer system) indicating that the gaze condition does not suggest causing to display the second user interface of the second computer system. In some embodiments, in response the first computer system determining that the movement condition is satisfied, but the gaze condition is not satisfied, the first computer system does not transfer user interaction from the first computer system to the second computer system (e.g., does not display the second user interface of the second computer system) and instead, the first computer system is configured to display the first user interface of the first computer system.

In some embodiments, the first computer system may determine that the change in contextual information satisfies the gaze condition (e.g., the user's gaze is directed toward the second computer system) indicating that the gaze condition suggests displaying the second user interface of the second computer system, but the first computer system determines that the change in contextual information does not satisfy the activation condition (e.g., finger touching the touch screen of the second computer system) indicating that the activation condition does not suggest causing to display the second user interface of the second computer system. In some embodiments, in response to the first computer system determining that the gaze condition is satisfied, but the activation condition is not satisfied, the first computer system does not transfer user interaction from the first computer system to the second computer system (e.g., does not display the second user interface of the second computer system) and instead, the first computer system is configured to display the first user interface of the first computer system. In some embodiments, in response to the first computer system determining that the gaze condition is satisfied, but the activation condition is not satisfied, the first computer system may transfer user interaction from the first computer system to the second computer system (e.g., display the second user interface of the second computer system). In some embodiments, after displaying the second user interface on the second computer system, the timeout period is lengthened to a second time (e.g., 5, 10, 15, 20, 25, or 30 seconds), and in accordance with a determination that the second computer system does not detect activation with the second user interface, the second computer system ceases to display the second computer system. Although FIG. 3 describes conditions 304-312, the first computer system may evaluate more or fewer conditions in view of the above teachings.

Figure 4:
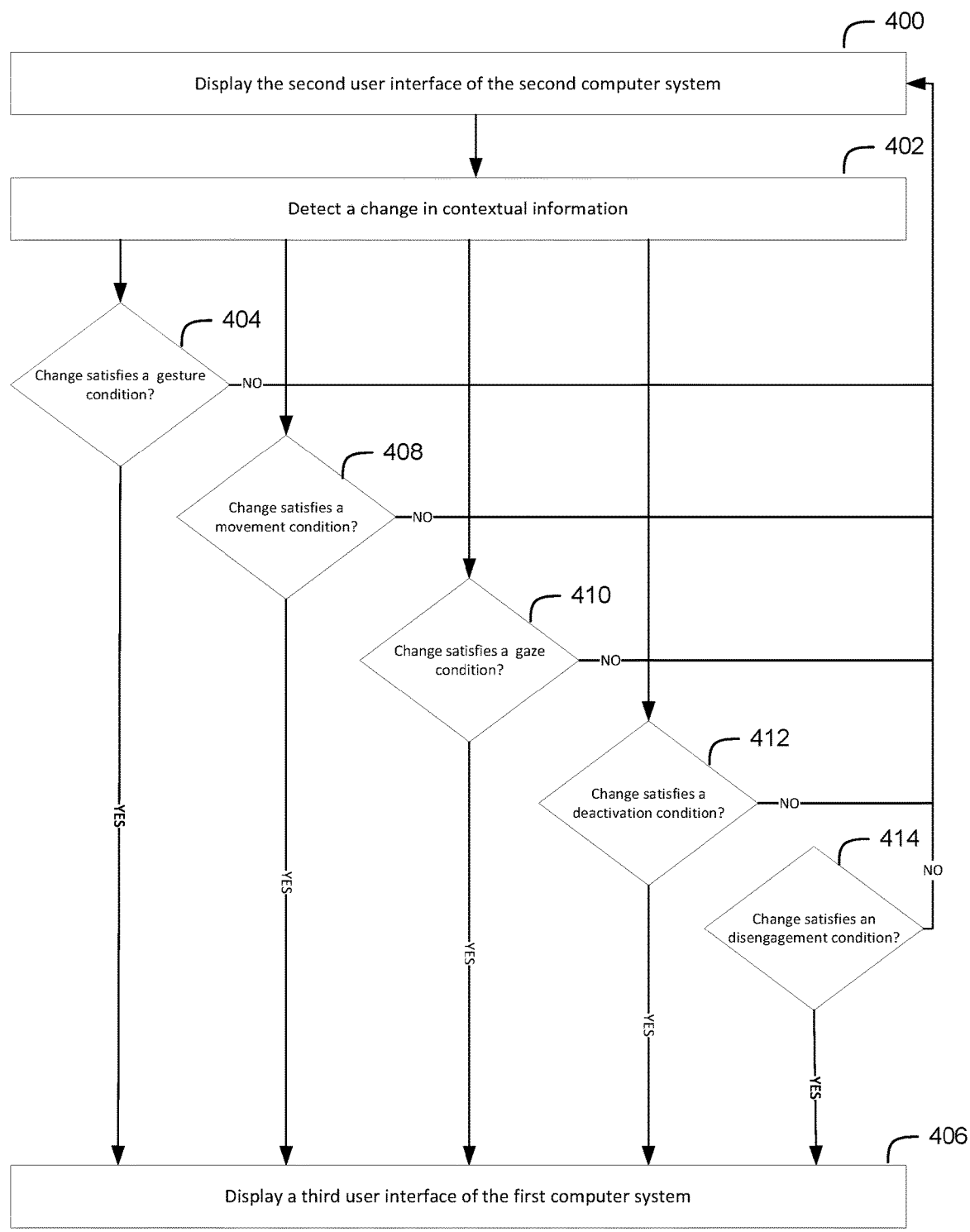

In some embodiments, the second computer system 106a can detect a change in contextual information indicative of transferring user interaction from the second computer system 106a to the first computer system 104a. In some embodiments, contextual information may be obtained from the second computer system 106a and/or one or more computer systems communicatively connected to the second computer system 106a (e.g., first computer system 104a). In some embodiments, after obtaining the contextual information, the second computer system 106a determines whether the contextual information satisfies one or more conditions for transferring user interaction from the second computer system 106a to the first computer system 104a. The one or more conditions are described in FIG. 4. FIG. 4 illustrates a logic flow including contextual information processing logic used with some embodiments, and operations that are performed by processing circuitry 106b including interface continuity logic 110. For example, the logic flow illustrated in FIG. 4 may be implemented in the second computer system 106a. As shown in FIG. 4, the second computer system 106a is configured to display, at operation 400, a second user interface of the second computer system (e.g., second computer system 106a), such as the second user interface 526 of the second computer system 518 illustrated in FIG. 5C. Returning to FIG. 4, the second computer system 106a may detect, at operation 402, a change in contextual information. The second computer system 106a may then implement interface continuity logic to determine whether the change satisfies various conditions. For example, the second computer system 106a may then implement interface continuity logic to determine whether the change satisfies a gesture condition at operation 404.

Figure 5A:
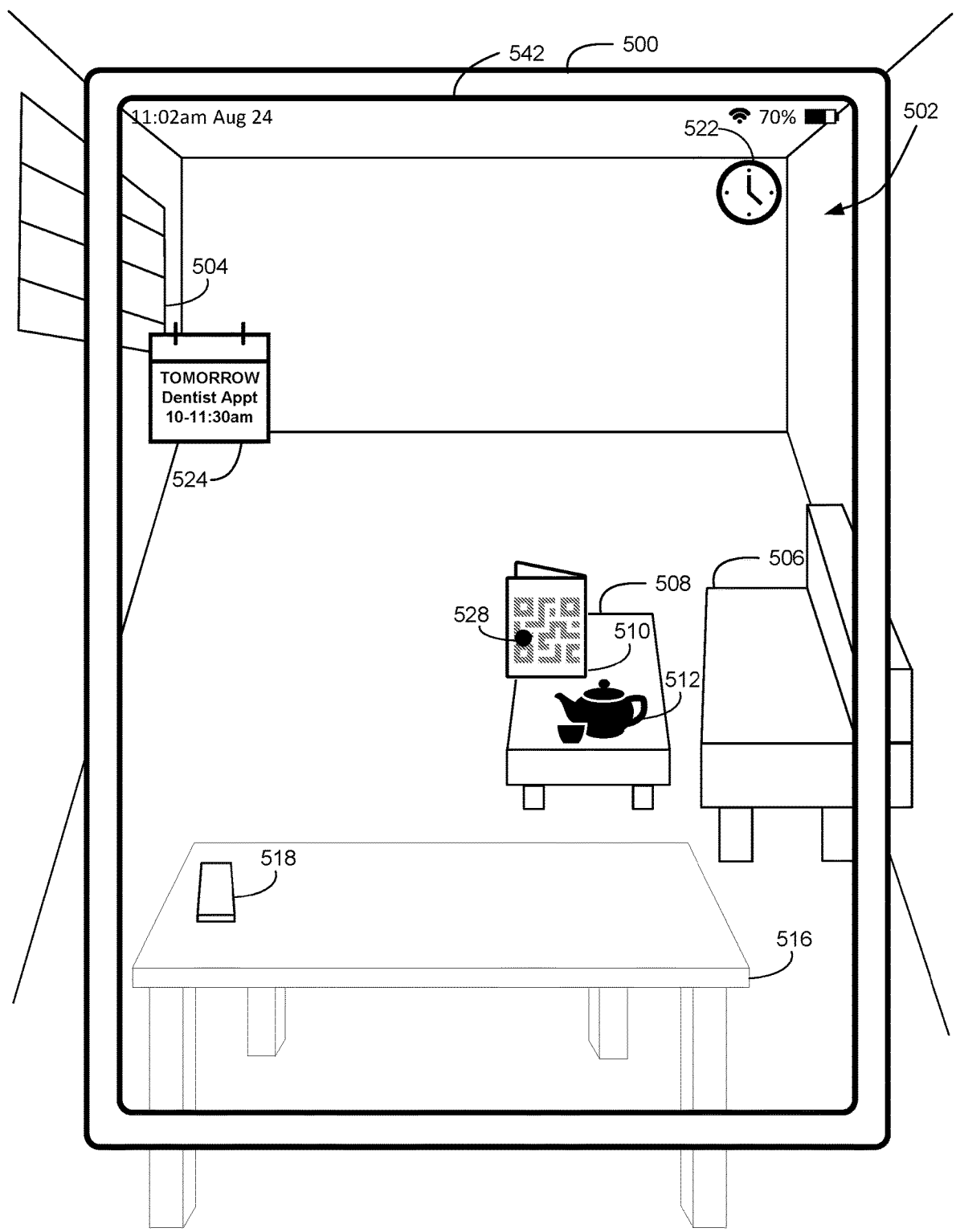
FIGS. 5A-5I illustrate transitioning from a first user interface of a first computer system to a second user interface of a second computer system in response to a change in contextual information in accordance with some embodiments of the disclosure.
Figure 5B:
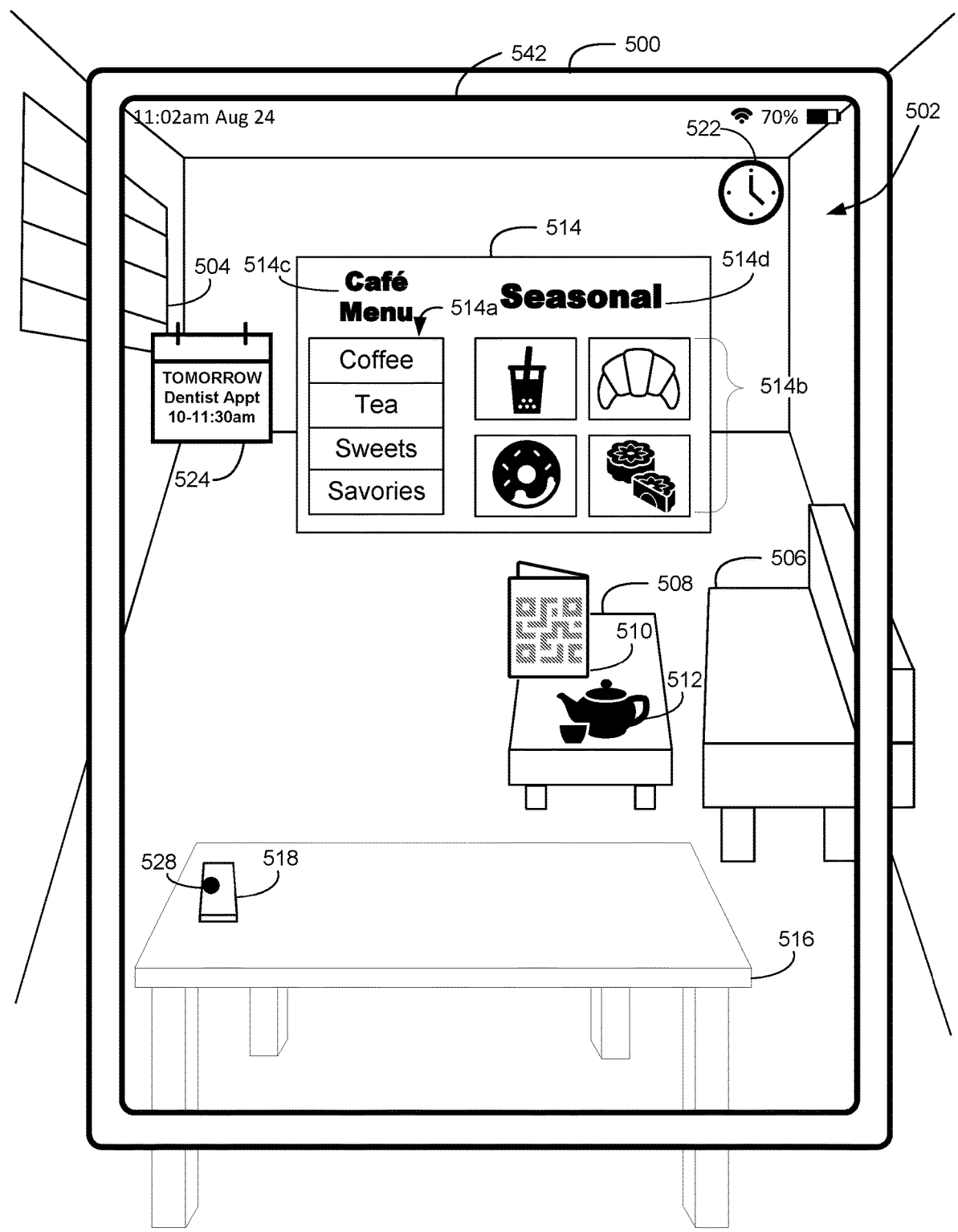
Figure 5C:
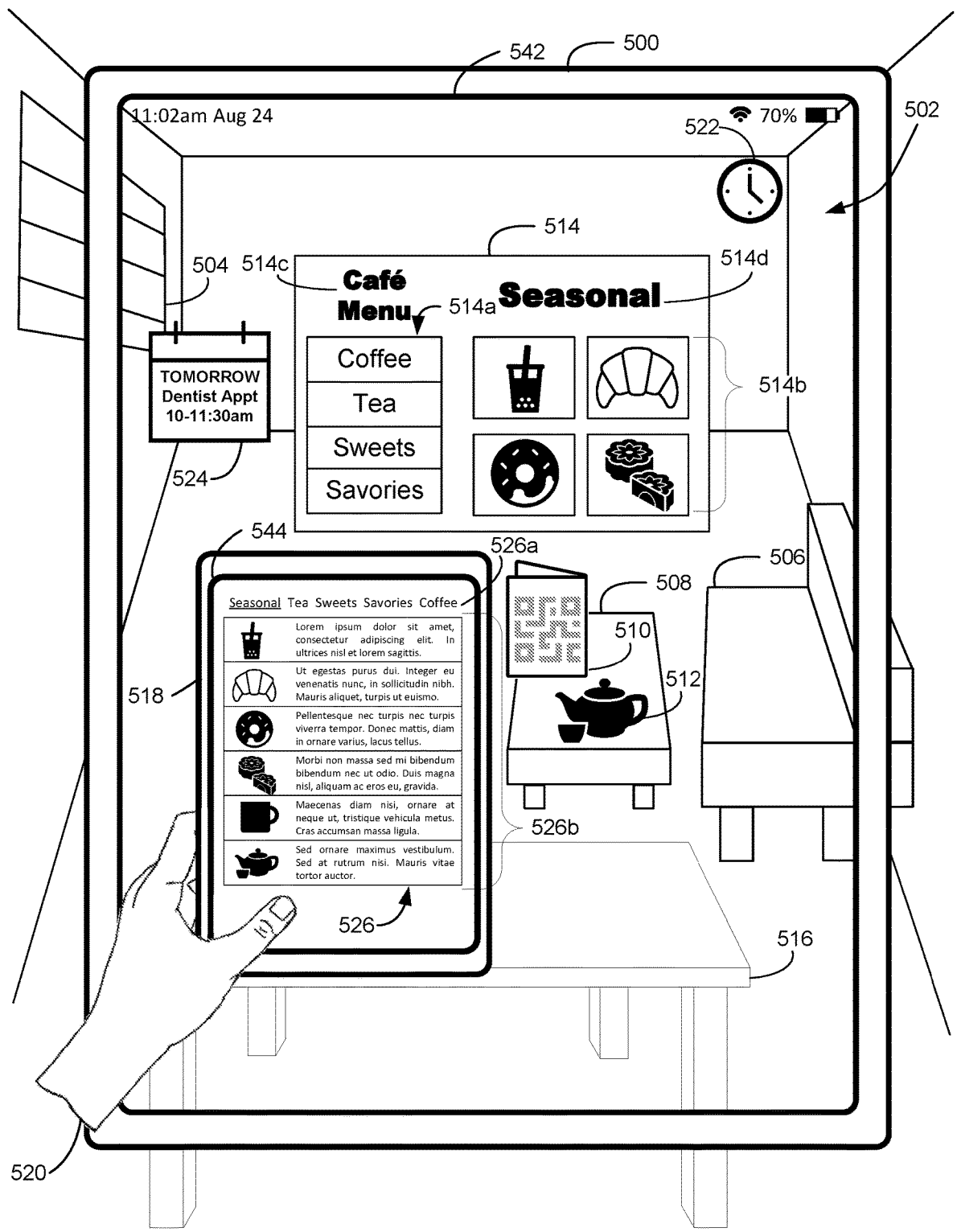
Figure 5D:
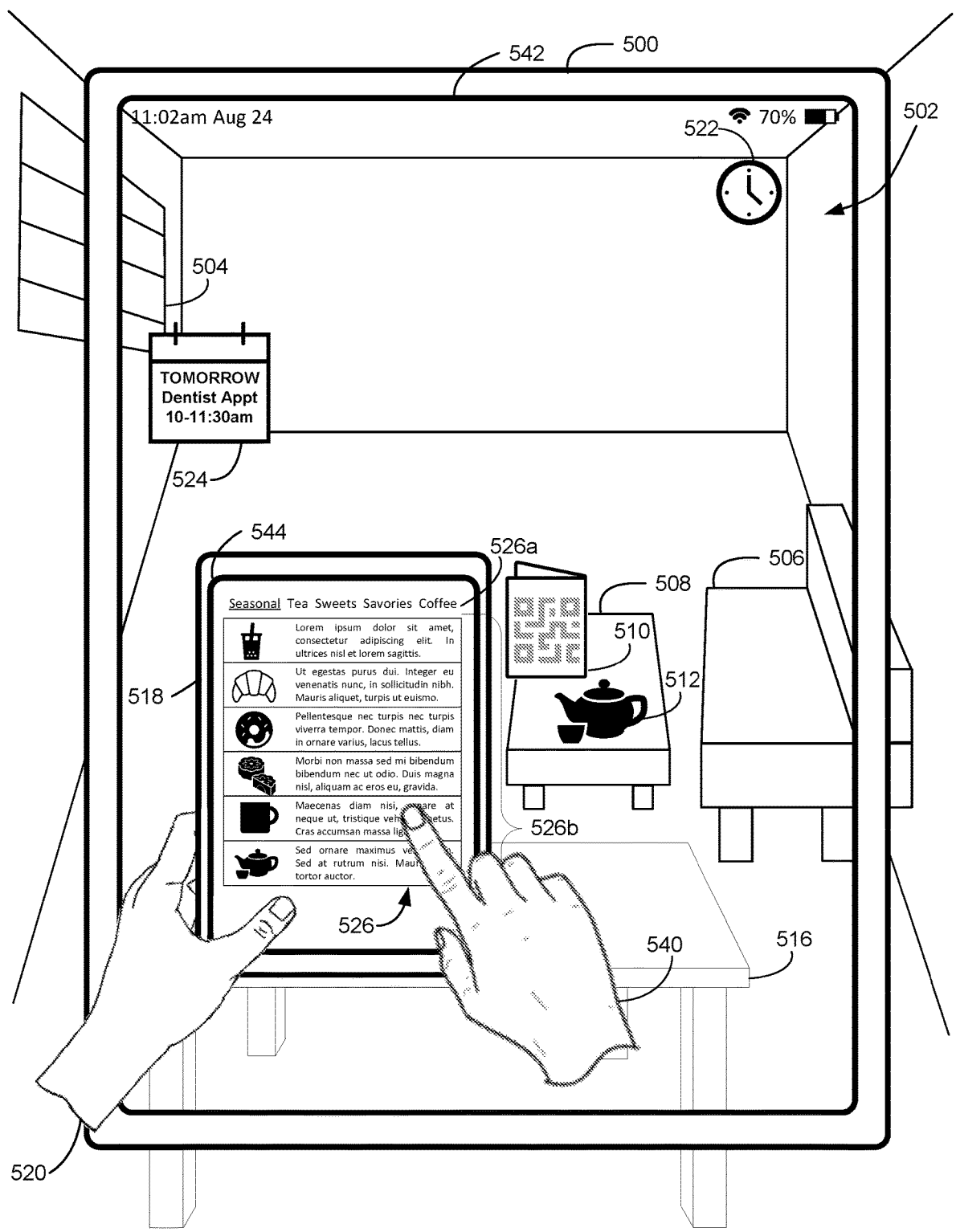
Figure 5E:
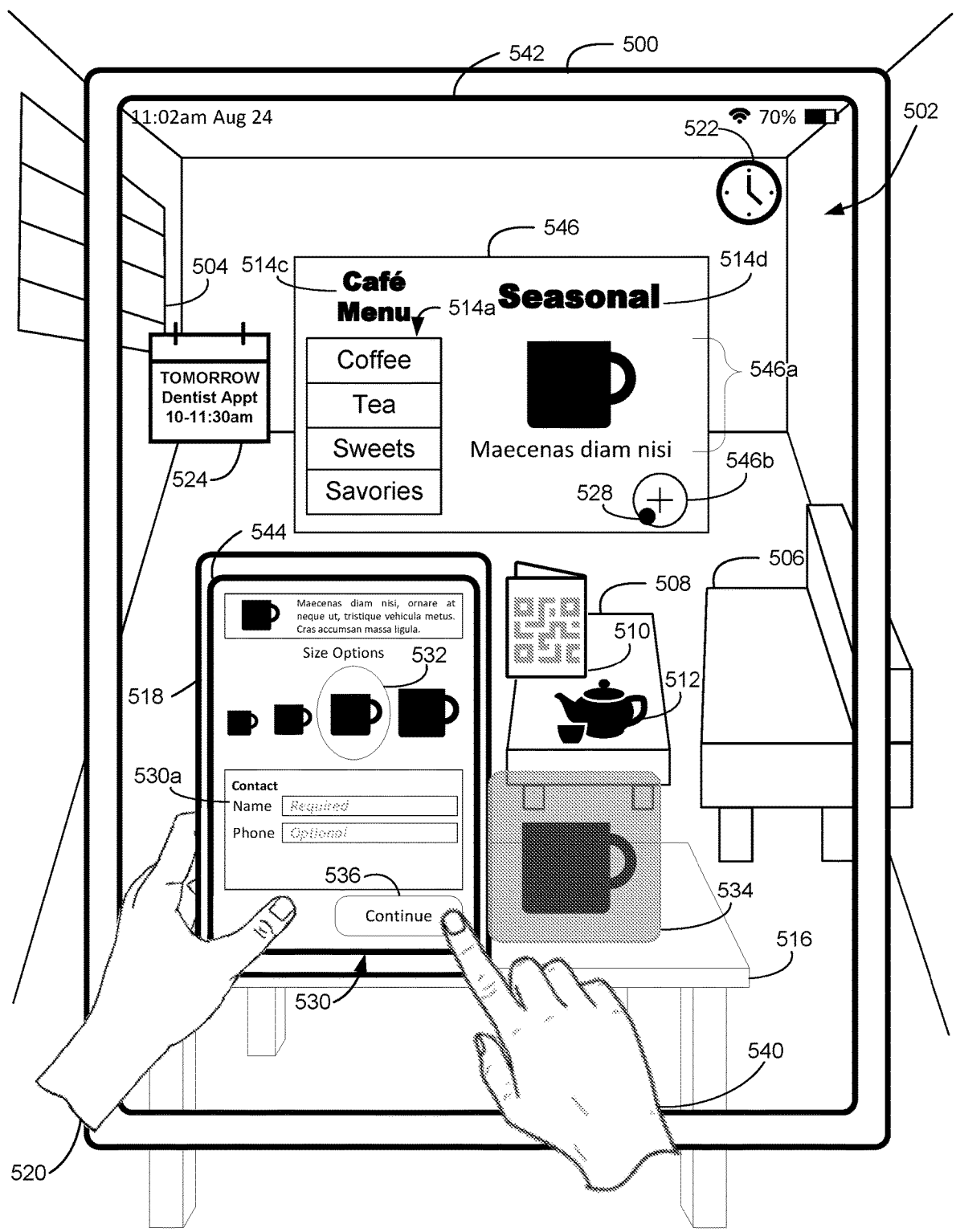
Figure 5F:
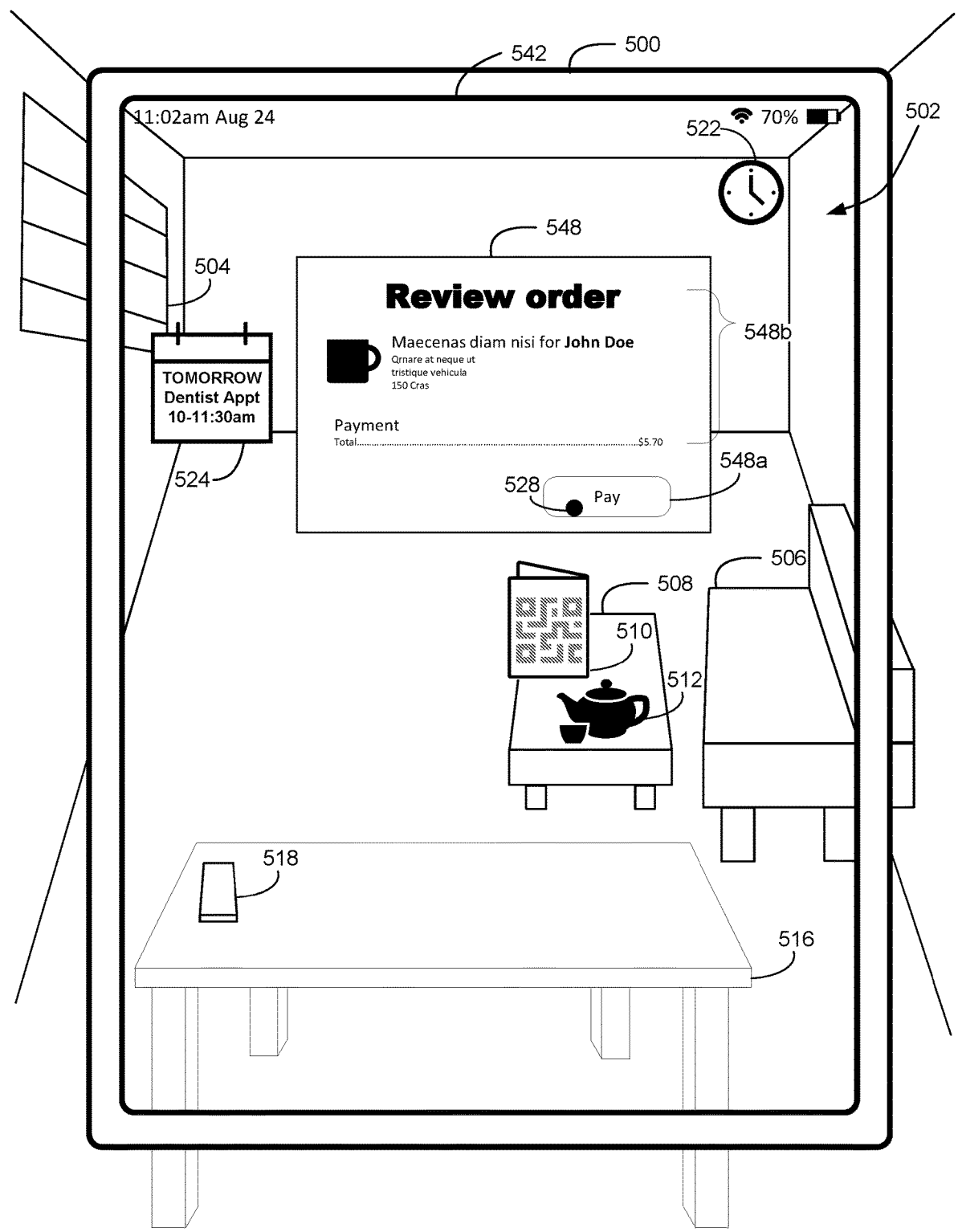
Figure 5G:
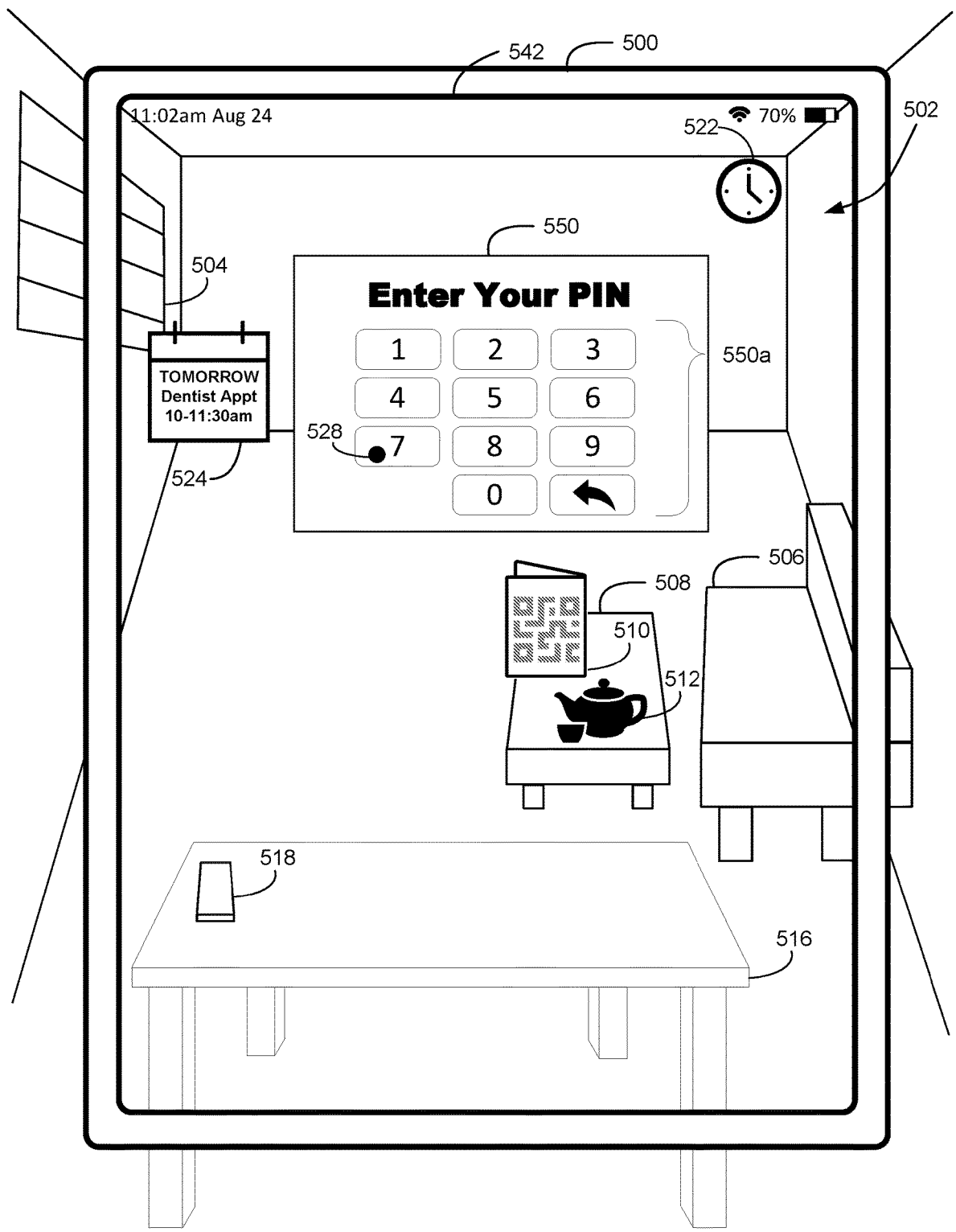

In some embodiments, the gesture condition may suggest displaying, at operation 406, a third user interface of the first computer system (e.g., first computer system 104a), such as a third user interface (e.g., virtual object 546) of the first computer system 500 illustrated in FIG. 5E. In some embodiments, a detection of an activation input directed towards the second computer system, such as contact and a swipe up gesture with the user's finger of hand 540 on the second computer system 518 (e.g., on a touch screen) in FIG. 5D may indicate causing the first computer system to display the third user interface. In some embodiments, the third user interface corresponds to a third session of the first application operating on the first computer system that is based at least in part on the second session of the first application operating on the second computer system.

In some embodiments, when the second computer system 106a determines that the change does not satisfy the gesture condition at operation 404 (e.g., indicating that the gesture condition does not suggest displaying, at operation 406, the third user interface of the first computer system), the second computer system proceeds to operation 400 and is configured to display the second user interface of the second computer system.

In some embodiments, the second computer system 106a may determine whether the change satisfies a movement condition at operation 408. In some embodiments, the movement condition may suggest displaying, at operation 406, the third user interface of the first computer system (e.g., first computer system 104a), such as the third user interface (e.g., virtual object 546) of the first computer system 500 illustrated in FIG. 5E. In some embodiments, a change in a relative pose between the second computer system, such as the second computer system 518 in FIG. 5B, and a reference point, such as the user's head, may indicate causing the first computer system to display the third user interface. For example, the change in the relative pose includes movement of the second computer system in a direction away from the first computer system. In some embodiments, the second computer system may determine, based on motion data associated with the second computer system, whether a threshold amount of motion has been detected. In some embodiments, the threshold amount of motion may represent a value that corresponds to an amount of motion expected to be detected by one or more motion sensors when a user sets the second computer system down on a table, or the like. In some embodiments, the first computer system detects a second change in the relative pose between the second computer system and a reference point corresponding to the first computer system (e.g., movement of the second computer system away from the first computer system) that is different from the first change in the relative pose between the second computer system and the reference point (e.g., movement of the second computer system towards the first computer system). In some embodiments, the change in the relative pose includes movement of the second computer system from a first pose to a second pose. For example, the first pose corresponding to the second computer system being held by the user (e.g., first change in relative pose between the second computer system and the reference point), such as hand 520 holding second computer system 518 in FIG. 5C. Movement of the second computer system from the first pose to the second pose (e.g., second change in the relative pose between the second computer system and the reference point) optionally includes the user putting the second computer system down such that the second pose corresponds to the second computer system in a position other than being held by the user, such as in a position lying on the surface of a physical table, such as second computer system 518 laying on top of table 516 shown in FIG. 5B.

In some embodiments, when the second computer system 106a determines that the change does not satisfy the movement condition at operation 408 (e.g., indicating that the movement condition does not suggest displaying, at operation 406, the third user interface of the first computer system), the second computer system proceeds to operation 400 and is configured to display the second user interface of the second computer system.

In some embodiments, the second computer system 106a may determine whether the change satisfies a gaze condition at operation 410. In some embodiments, the gaze condition may suggest displaying, at operation 406, a third user interface of the first computer system (e.g., first computer system 104a), such as the third user interface (e.g., virtual object 548) of the first computer system 500 illustrated in FIG. 5F. In some embodiments, a detection of an attention (e.g., gaze) of a user of the first computer system directed away from the second computer system may indicate causing the first computer system to display a third user interface. For example, a determination that the attention of the user of the first computer is changed from being directed toward the second computer system to being directed away from the second computer system for a period of time greater than a threshold period of time (e.g., 5, 7, 10, 15, 20, 30, 40, 50, or 60 seconds). In some embodiments, detecting that the attention of the user is directed away from the second computer system includes detecting that the attention of the user corresponds to a location where the first user interface of the first computer system was previously displayed. In some embodiments, when the second computer system 106a and/or the first computer system 104a determines that the change does not satisfy the gaze condition at operation 410 (e.g., indicating that the gaze condition does not suggest causing to display, at operation 406, the third user interface of the first computer system), the second computer system 106a and/or the first computer system 104a proceeds to operation 400 and is configured to display the second user interface of the second computer system.

In some embodiments, the second computer system 106a and/or the first computer system 104a may determine whether the change satisfies a deactivation condition at operation 412. In some embodiments, the deactivation condition may suggest displaying, at operation 406, a third user interface of the first computer system (e.g., first computer system 104a), such as the third user interface (e.g., virtual object 548) of the first computer system 500 illustrated in FIG. 5F. In some embodiments, a detection of the deactivation input at the second computer system may indicate causing the first computer system to display the third user interface. For example, the deactivation input includes locking or closing the second computer system (e.g., deactivating the second computer system or putting the second computer system in a sleep or inactive state). In some embodiments, when the second computer system 106a and/or the first computer system 104a determines that the change does not satisfy the deactivation condition at operation 412 (e.g., indicating that the deactivation condition does not suggest displaying, at operation 406, the third user interface of the first computer system), the second computer system 106a and/or the first computer system 104a proceeds to operation 400 and is configured to display the second user interface of the second computer system.

In some embodiments, the second computer system 106a and/or the first computer system 104a may determine whether the change in contextual information satisfies disengagement condition at operation 414. In some embodiments, the disengagement condition may suggest displaying, at operation 406, a third user interface of the first computer system (e.g., first computer system 104a), such as the third user interface (e.g., virtual object 548) of the first computer system 500 illustrated in FIG. 5F. In some embodiments, when user interaction indicates disengagement with the first application (e.g., second user interface of the second computer system) and instead, interaction with another application, different from the first application operating on the second computer system (e.g., an application other than the first application) when detecting the change in contextual information may indicate causing the first computer system to display a third user interface. For example, the third user interface is a user interface associated with a second application, different from the first application operating on the second computer system. In some embodiments, the second application is different from the first application operating on the first computer system. In some embodiments, when the second computer system 106a and/or the first computer system 104a determines that the change in contextual information does not satisfy the disengagement condition at operation 414 (e.g., indicating that the disengagement condition does not suggest displaying, at operation 406, the third user interface of the first computer system), the second computer system 106a and/or the first computer system 104a proceeds to operation 400 and is configured to display the second user interface of the second computer system.

It should be appreciated that, in some embodiments, the second computer system may determine whether the change in contextual information satisfies a combination of some or all of the conditions described in FIG. 4. For example, the second computer system may transfer user interaction from the second computer system to the first computer system in accordance with a determination that the second computer system has been deactivated, such as by detecting a user input to put the second computer system in a sleep or inactive state, and that the user's gaze is directed away from the display of the second computer system. In another example, the second computer system may transfer user interaction from the second computer system to the first computer system in accordance with a determination that user interaction indicates disengagement with the second computer system, such as by detecting a swipe input with the user's hand on the touch screen of the second computer system to dismiss the second user interface and detecting movement of the second computer system, such putting the second computer system down on a table.

In some embodiments, the second computer system may determine that the change in contextual information satisfies the movement condition (e.g., the user's head is directed away from second computer system) indicating that the movement condition suggests displaying the third user interface of the first computer system, but the second computer system determines that the contextual information does not satisfy the disengagement condition (e.g., user is interacting with another application such as the phone application that is different from the first application) indicating that the disengagement condition does not suggest causing to display the third user interface of the first application via the first computer system. In some embodiments, in response to the first computer system determining that the movement condition is satisfied, but the disengagement condition is not satisfied, the first computer system does not transfer user interaction from the second computer system to the first computer system (e.g., does not display the third user interface of the first computer system).

In some embodiments, the second computer system and/or first computer system may determine that the change in contextual information satisfies the gaze condition (e.g., the user's gaze is directed toward a region associated with the first computer system) indicating that the gaze condition suggests displaying the third user interface of the first computer system, but the second computer system determines that the change in contextual information does not satisfy the movement condition (e.g., user is holding the second computer system in view) indicating that the movement condition does not suggest causing to display the third user interface of the first computer system. In some embodiments, in response to the first computer system determining that the gaze condition is satisfied, but the movement condition is not satisfied, the second computer system does not transfer user interaction from the second computer system to the first computer system (e.g. does not display the third user interface of the first computer system) and instead, the second computer system is configured to display the second user interface of the second computer system. In some embodiments, in response to the first computer system determining that the gaze condition is satisfied, but the movement condition is not satisfied, the second computer system may transfer user interaction from the second computer system to the first computer system (e.g., display the third user interface of the first computer system). In some embodiments, after displaying the third user interface on the first computer system, the timeout period is lengthened to a second time (e.g., 5, 10, 15, 20, 25, or 30 seconds), and in accordance with a determination that the second computer system does not detect that the movement condition is satisfied (e.g., the user putting the second computer system down and not in view), the first computer system ceases to display the third user interface. Although FIG. 4 describes conditions 404-414, the second computer system and/or first computer system may evaluate more or fewer conditions in view of the above teachings.

FIGS. 5A-5I illustrate examples of transitioning from a first user interface of a first computer system to a second user interface of a second computer system in response to a change in contextual information in accordance with some embodiments.

FIG. 5A illustrates a first computer system 500 (e.g., first computer system 104a) displaying, via a display 542 (e.g., display generation component), a three-dimensional environment 502 from a viewpoint of the user optionally facing the back wall of the physical environment in which the first computer system 500 is located. As described above, the first computer system 500 optionally includes a display 542 (e.g., a touch screen) and a plurality of image sensors. The image sensors optionally include one or more of a visible light camera, an infrared camera, a depth sensor, or any other sensor the first computer system 500 would be able to use to capture one or more images of a user or a part of the user (e.g., one or more hands of the user) while the user interacts with the first computer system 500. In some embodiments, the user interfaces illustrated and described below could also be implemented on a head-mounted display that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 5A, first computer system 500 captures one or more images of the physical environment around first computer system 500, including one or more objects in the physical environment around first computer system 500. In some embodiments, first computer system 500 displays representations of the physical environment in three-dimensional environment 502 or portions of the physical environment are visible via the display 542 of first computer system 500. For example, three-dimensional environment 502 includes portions of the left and right walls, the ceiling, and the floor in the physical environment of the user. The three-dimensional environment 502 also optionally includes representations of physical objects such as a window 504, tables 508 and 516 sofa 506, paper menu 510, and/or a teapot 512 that are in the physical environment. For example, second computer system 518 (e.g., second computer system 106a) is a real-world smartphone that is in the physical environment disposed on the surface of table 516.

In some embodiments, a fully immersive environment (e.g., virtual reality) or mixed reality environment includes virtual content displayed on an optical see-through portion of the display 542 (e.g., transparent or semi-transparent) so as to appear superimposed over the physical environment, such as virtual object 524 of FIG. 5A displayed overlaid a back wall in the physical environment. In this example, the back wall is visible through the optical see-through portion of the display 542. In some embodiments, virtual content may be displayed at a location in the three-dimensional environment 502 that corresponds to (or is associated with) a location of a physical object (e.g., known visual landmark or reference target) in the physical environment, such as virtual object 534 of FIG. 5E displayed in a same region as the second computer system 518. For example, virtual object 534 is displayed in a region/location corresponding to the region/location of the second computer system 518. In this example, the virtual object 534 extends at least in part beyond a boundary of the second computer system 518. In some embodiments, the virtual content may be displayed in place of (e.g., replaces) the physical object. In some embodiments, the location of the physical object is determined by one or more image sensors or cameras of the first computer system 500 that monitor the physical environment visible through the optical see-through portion of the display 542.

Returning to FIG. 5A, three-dimensional environment 502 also includes virtual objects such as virtual object 524 and virtual object 522. Virtual objects are optionally one or more of user interfaces of applications (e.g., messaging user interface, or content browsing user interface), three-dimensional objects (e.g., virtual clock, virtual ball, or virtual car), machine readable code (e.g., a bar code, quick-response (QR) code, displayed characters, or another type of visual pattern that includes machine readable information) or any other element displayed by the first computer system 500 that is not included in the physical environment of the first computer system 500. For example, as shown in FIG. 5A, virtual object 524 is optionally a calendar user interface that includes virtual content related to the user's calendar events. Virtual object 522 is optionally a virtual clock.

In FIG. 5A, paper menu 510 includes a QR code that is associated with the café where the user of the first computer system 500 is physically located. In some embodiments, the first computer system 500 may identify the QR code on a physical object such as paper menu 510. In some embodiments, the QR code is selectable to display a user interface of a food ordering application. In some embodiments, the user interface of the food ordering application is displayed by the first computer system 500 in accordance with a determination that the physical location of the user of the first computer system 500 corresponds to the location of the café. For example, prior to displaying the user interface of the food ordering application, the first computer system 500 detects that the first computer system 500 is in proximity of the point of interest (e.g., café), and in response, the first computer system optionally displays the user interface of the food ordering application, wherein the food ordering application is associated with the point of interest.

In some embodiments, the first computer system 500 displays one or more virtual objects in response to detecting the attention (e.g., gaze) of the user directed toward the QR code of the paper menu 510. For example, from FIG. 5A to FIG. 5B, the first computer system 500 detects that the attention of the user (e.g., attention input/gaze input 528) is directed toward a location corresponding to the QR code of the paper menu 510 indicative of the user intending to activate the QR code. In response, the first computer system 500 displays virtual object 514. As shown in FIG. 5A, prior to attention input/gaze input 528 being directed toward the QR code of the paper menu 510, the virtual object 514 was not displayed within three-dimensional environment 502. Virtual object 514 is optionally a menu user interface that includes a plurality of selectable virtual objects and/or virtual content. One or more of the plurality of selectable virtual objects may optionally initiate a process for ordering food in a first session of the food ordering application (e.g., first application 104c). In some embodiments, the first computer system 500 displays the virtual object 514 including a number of selectable virtual objects and virtual content having a visual appearance suitable based on the type of computer system (e.g., smartphone, tablet, desktop/laptop computer, smartwatch, or HMD). For example, the user interface of the first application 104c and its selectable virtual objects and virtual content are generated and correspond to the type of computer system. In some embodiments, different types of computer systems include varying properties, such as display size, pixel density, display resolution, and orientation. As shown in FIG. 5B, the first computer system 500 corresponding to an HMD displays virtual object 514 (e.g., first user interface) includes a first number or set of selectable virtual objects, such as selectable virtual objects 514a and 514b and first virtual content, such as virtual content 514c and 514d. In some embodiments, the virtual object 514 displayed by display 542 of the first computer system 500 corresponds to a first level of detail suitable for the HMD and its properties.

In some embodiments, the first computer system 500 and/or second computer system 518 provide seamless session continuity of the first application from the first computer system 500 to the second computer system 518. For example, in FIG. 5B, the first computer system 500 detects a change in contextual information, such as the attention of the user (e.g., attention input/gaze input 528) directed toward the second computer system 518 and/or movement of a portion of the user, such as hand 520 holding second computer system 518 in FIG. 5C. In some embodiments, the first computer system determines whether the attention of the user satisfies gaze condition 308 and/or movement condition 304 as described herein. In response, the first computer system 500 causes the second computer system 518 to display, via display 544 of the second computer system 518, a second user interface, such as user interface 526 in FIG. 5C. In some embodiments, the second user interface corresponds to a second session of the first application operating on the second computer system 518 (e.g., second computer system 106a) based at least in part on the first session of the first application (e.g., first application 104c of the first computer system 104a/500). In some embodiments, the second session of the first application operating on the second computer system and the first session of the first application operating on the first computer system correspond to active, current application sessions (e.g., until the user closes or terminates the respective first application by switching to another application and/or a predetermined period of time has elapsed and the respective first application is inactive or asleep). In some embodiments, the second computer system 518 displays user interface 526 including a number of selectable user interface objects and user interface content having a visual appearance suitable based on the type of computer system. For example, the second computer system 518 corresponding to a smartphone displays user interface 526 (e.g., second user interface) including a second number or set of selectable user interface objects, such as selectable user interface objects 526a and 526b. In some embodiments, user interface 526 displayed by display 544 of the second computer system 518 corresponds to a second level of detail suitable for the smartphone and its properties. For example, user interface 526 optionally includes more detail (e.g., descriptions of food items) compared to virtual object 514. User interface 526 further optionally includes a greater number of selectable user interface objects 526a (e.g., food items) compared to virtual object 514 having selectable virtual objects 514b. In some embodiments, the visual appearance differs between the two user interfaces, such as selectable user interface objects 526a displayed horizontally on the second user interface (e.g., user interface 526) compared to selectable user interface objects 526a displayed vertically on the first user interface (e.g., virtual object 514).

In some embodiments, the first computer system 500 may cease displaying virtual object 514 such that only the second user interface (e.g., user interface 526) corresponding to the second session of the first application operating on the second computer system 518 is displayed as shown in FIG. 5D. In some embodiments, the first computer system 500 may cease displaying virtual object 514 in response to user input corresponding to a request to terminate the first session of the first application operating on the first computer system. In some embodiments, the first computer system 500 may cease displaying virtual object 514 in response to user input corresponding to a request to interact with another user interface other than virtual object 514, such as user interface 526 of the second computer system 518 or virtual objects 522 or 524 of the first computer system. In some embodiments, ceasing to display virtual object 514 is not indicative of terminating the first application because the user may continue interacting with the first application on the second computer system. For example, the second computer system 518 displays the second user interface corresponding to the second session of the first application based at least in part on the recently terminated first session of the first application of the first computer system 500.

In some embodiments, input to the first computer system 500 and/or the second computer system 518 is provided via gestures from hand 540 in air as shown in FIG. 5D and/or the attention of the user, or via the display 544 from hand 540, and inputs described herein are optionally received via the display 544, a trackpad (not shown), or via air gestures/attention. In some embodiments, if the attention input/gaze input includes an activation input, such as an input from hand 540 directed toward the second computer system 518, the second computer system 518 performs an operation associated with one of the selectable user interface objects 526b. For example, in FIG. 5D, the second computer system 518 detects the activation input (e.g., finger of hand 540 touching display 544 of the second computer system 518 and/or a pinch gesture from hand 540 in air while the attention input/gaze input is directed toward one of the selectable user interface objects 526b) for performing the operation associated with one of the selectable user interface objects 526b. In response to detecting the activation input, the second computer system 518 optionally performs the operation associated with one of the selectable user interface objects 526b such as updating the display 544 to display user interface 530 in FIG. 5E. In some embodiments, user interface 530 is associated with the process for ordering food in the second session of the food ordering application (e.g., second application 106c). The user interface 530 optionally includes a number of selectable user interface objects, such as user interface objects 532 and 536, and user interface text input element 530a having a visual appearance suitable for the second computer system 518.

In some embodiments, in response to detecting the activation input corresponding to the finger of hand 540 touching display 544 of the second computer system 518 in FIG. 5D, the first computer system 500 optionally performs the operation associated with one of the selectable user interface objects 526b such as displaying, via display 542 of the first computer system 500, virtual object 546 in FIG. 5E having a third user interface. In some embodiments, the third user interface corresponds to a third session of the first application operating on the first computer system 500 (e.g., first application 104c) that is based at least in part on the second session of the second application operating on the second computer system 518 (e.g., second application 106c). In some embodiments, the first computer system 500 displays the third user interface in response to detecting that the attention of the user (e.g., attention input/gaze input 528) is directed away from second computer system 518 as shown in FIG. 5E. In some embodiments, detecting that the attention of the user is directed away from the second computer system 518 includes detecting that the attention of the user corresponds to a location where the first user interface of the first computer system was previously displayed as shown by attention input/gaze input 528 in FIG. 5E. In some embodiments, the first computer system and/or second computer system determines whether the attention of the user satisfies gaze condition 410 as described herein. In some embodiments, virtual object 546 includes a second number or second set of selectable virtual objects, such as selectable virtual objects 514a and first virtual content, such as virtual content 514c and 514d, as well as additional selectable virtual objects, such as virtual object 546b and virtual content 546a shown in FIG. 5E. In some embodiments, the virtual object 546 includes less detail information compared to user interface 530 of the second computer system 518. For example, virtual object 546 includes virtual content 546a which includes a short description of the food item compared to user interface 530 which includes a detailed description of the food item and additional information, such as, for example, available sizes of the food item, and an ingredient list.

In some embodiments, the first computer system 500 and/or second computer system 518 provide input continuity between the first computer system 500 and the second computer system 518. For example, in FIG. 5E, the first computer system 500 detects that the attention of the user (e.g., attention input/gaze input 528) is directed toward virtual object 546b. In some embodiments, virtual object 546b corresponds to a request to add the food item to an order. In some embodiments, in response to detecting the that the attention of the user is directed toward the virtual object 546b, the first computer system 500 initiates an operation associated with virtual object 546b. For example, in some embodiments, initiating an operation associated with virtual object 546b includes causing the second computer system 518 to display, via display 544 of the second computer system 518, user interface 530 in FIG. 5E. In some embodiments, the first computer system determines whether one or more of the conditions described with reference to FIG. 3 is satisfied before causing the second computer system 518 to display the second user interface as described herein. In some embodiments, if the operation includes requiring user input, such as entering text, the first computer system 500 is configured to cause the second computer system 518 to display in user interface 530 prompts for user input, such as text input element 530a requesting a name and phone number for the food order in FIG. 5E. In some embodiments, after the second computer system 518 receives text in the text input element 530a, the second computer system 518 detects activation input corresponding to the finger of hand 540 touching display 544 in a region of display 544 corresponding to user interface object 536. In some embodiments, in response to detecting the activation input corresponding to the finger of hand 540 touching a region of display 544 corresponding to user interface object 536 in FIG. 5E, the second computer system 518 optionally performs the operation associated with user interface object 536, such as causing display, via display 542 of the first computer system 500, a virtual object having a fourth user interface, such as virtual object 548 that is based at least in part on the second session of the second application operating on the second computer system 518 (e.g., second application 106c).

In some embodiments, virtual object 548 is associated with the process for ordering food in the fourth session of the food ordering application (e.g., first application 104c). The virtual object 548 optionally includes a selectable virtual object, such as virtual object 548a, and virtual content 548b having a visual appearance suitable for the first computer system 500. In some embodiments, if a next operation associated with the session includes requiring user input that may be sensitive, such as entering a passcode or pin, the first computer system 500 is configured to display a user interface for entering the passcode instead of causing the second computer system 518 to display a user interface for entering the passcode. For example, the first computer system 500 may determine that the user is not in an expected location (e.g., home location) and is instead located in a public space such that entering sensitive information may require a more secure method of entering the passcode. As such, in some embodiments, in response to determining that the user is not in an expected location, the first computer system 500 may determine the more secure means of entering the passcode between the first computer system 500 and the second computer system 518. For example, in FIG. 5B, the first computer system 500 detects that the attention of the user (e.g., attention input/gaze input 528) is directed toward the virtual object 548a, the first computer system 500 initiates an operation associated with virtual object 548a. For example, in some embodiments, initiating an operation associated with virtual object 548a includes causing the first computer system 500 to display, via display 542 of the first computer system 500, virtual object 550 in FIG. 5G. In some embodiments, virtual object 550 is optionally a user interface for selecting a PIN (personal identification number) that includes a plurality of selectable virtual objects 550a for selecting the PIN. By presenting the PIN user interface via the first computer system 500 where the user may enter their PIN via gaze-based interaction (e.g., attention input/gaze input 528) avoids shoulder-surfing attacks in which an unauthorized user strategically positions themselves over the shoulder of the user in order to view the screen of the user's mobile device as the PIN is being entered, such as second computer system 518. In some embodiments, prior to the first computer system 500 displaying virtual object 550, the first computer system may determine whether one or more of the conditions of FIG. 4 is satisfied as described herein.

Figure 5H:
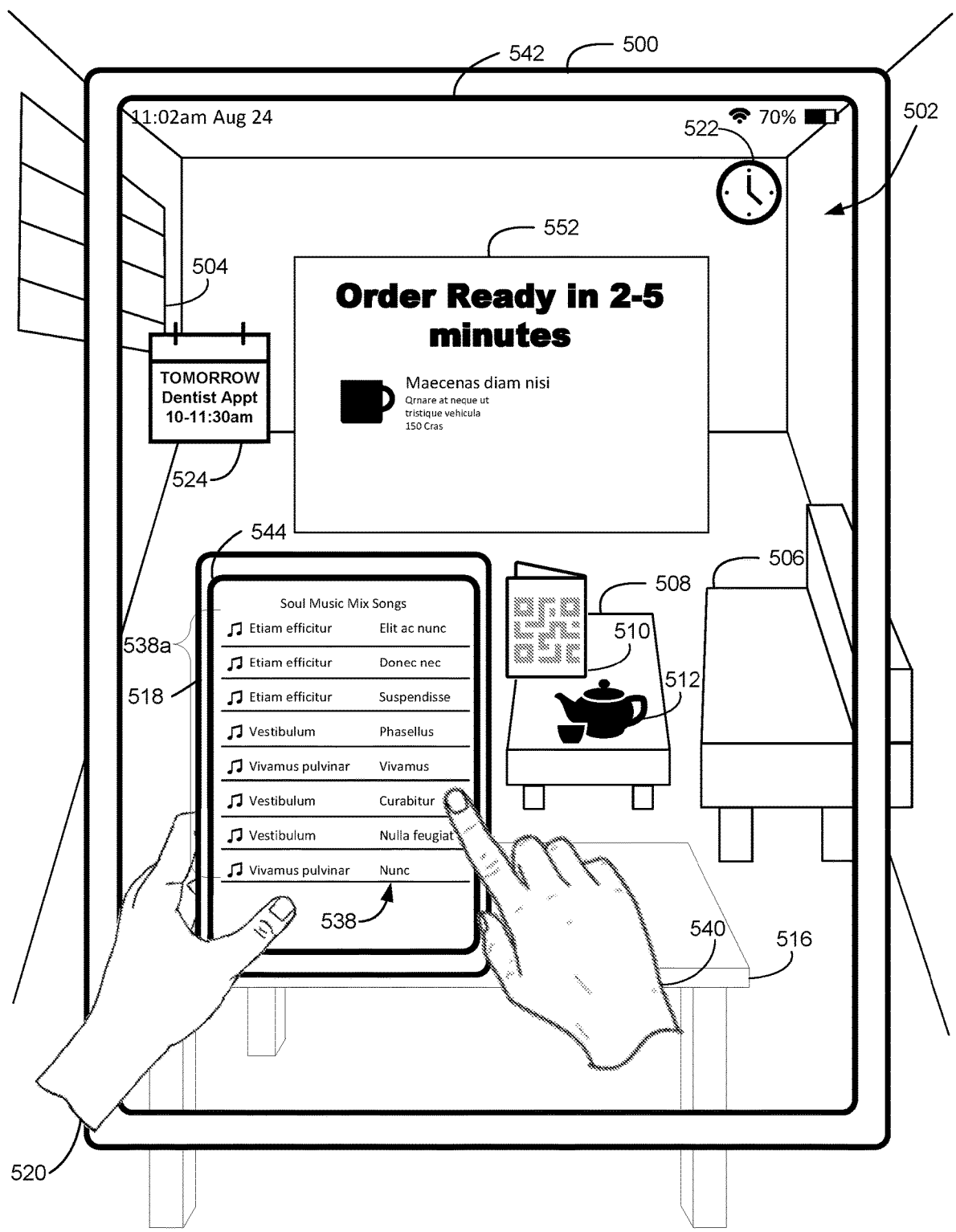

As shown in FIG. 5H, the first computer system 500 displays virtual object 552 in response to receiving a valid PIN entered via virtual object 550. In some embodiments, virtual object 552 is optionally a user interface for displaying content corresponding to a food order confirmation.

Figure 5I:
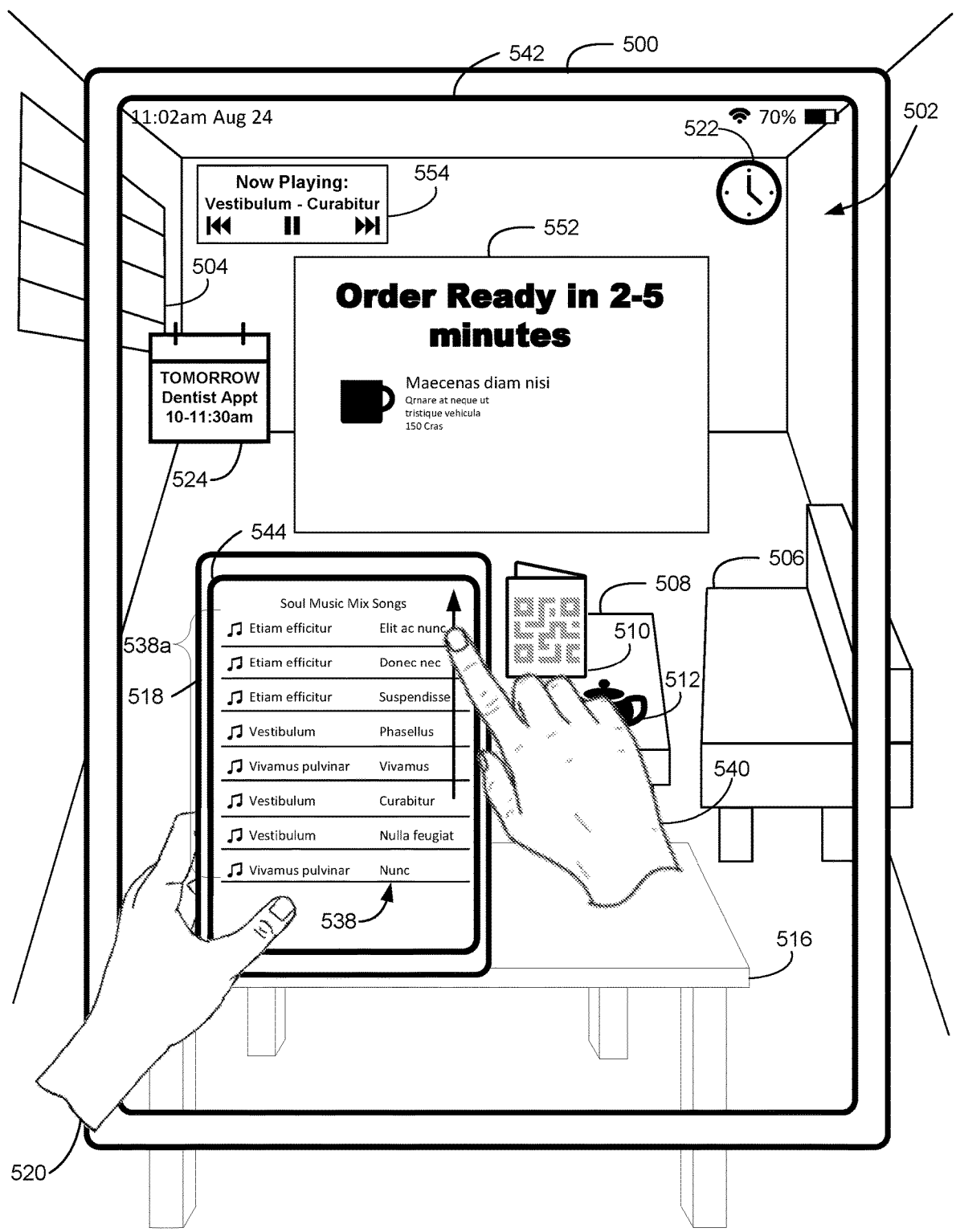

FIGS. 5H and 5I illustrate another example of input continuity between the second computer system 518 and first computer system 500. In FIG. 5H, the second computer system 518 optionally displays, via display 544, user interface 538. In some embodiments, user interface 538 is optionally a music player user interface that includes one or more selectable virtual objects 538a to initiate playback of a first media item ("Vestibulum Curabitur"). In some embodiments, the second computer system 518 detects the activation input (e.g., finger of hand 540 touching display 544 of the second computer system 518 and/or an air pinch gesture from hand 540) for performing the operation associated with one of the selectable virtual objects 538a. In response to detecting the activation input, the second computer system 518 optionally performs the operation associated with one of the selectable virtual objects 538a such as initiating playback of the first media item ("Vestibulum Curabitur").

In some embodiments, the second computer system detects a change in contextual information such as an activation input that satisfies the gestures condition described with reference to FIG. 4. For example, a detection of an activation input directed towards the second computer system 518, such as contact using finger of hand 540 touching display 544 and a swipe up gesture with the user's finger on the second computer system 518 in FIG. 5I may indicate causing the first computer system to display virtual object 554. In some embodiments, virtual object 554 is optionally a music player user interface that includes content indicative of playback of the first media item ("Vestibulum Curabitur") that was selected from the second computer system 518. However, the present embodiments and example are not limited to food ordering or music player/browsing applications, but can include other or additional applications in multiple scenarios and user interactions.

FIG. 6 is a flowchart illustrating a method 600 of transitioning from a first user interface of a first computer system to a second user interface of a second computer system in response to a change in contextual information according to some embodiments of the disclosure. The method 600 is optionally performed at a first computer system (e.g., first computer system 104a of FIG. 1), when presenting three-dimensional virtual objects described above with reference to FIGS. 5A-5I. Some operations in method 600 are, optionally combined and/or order of some operations is, optionally, changed. At 602a, the method includes while the first computer system is in communication with a second computer system, different from the first computer system, such as the first computer system 500 and the second computer system 518 of FIG. 5A, and while displaying, via the display, a first user interface that corresponds to a first session of a first application operating on the first computer system, such as virtual object 514 in FIG. 5B, the first computer system detects, via the one or more input devices at 602b, a change in contextual information, wherein the change in contextual information includes a first change in a relative pose between the second computer system and a reference point at 602b. In some embodiments, at 602c, in response to detecting the change in contextual information, and in accordance with a determination that one or more criteria are satisfied at 602d, the first computer system causes the second computer system to display a second user interface that corresponds to a second session of the first application operating on the second computer system based at least in part on the first session of the first application at 602e, such as user interface 526 of the second computer system 518 in FIG. 5C. In some embodiments, at 602f, in accordance with a determination that the one or more criteria are not satisfied, forgoing causing the second computer system to display the second user interface of the first application. In some embodiments, the one or more criteria include one or more conditions described with reference to FIG. 3.

Alternatively or additionally to one or more of the embodiments disclosed above, in some embodiments, causing the second computer system to display the second user interface includes: while displaying the first user interface including a first affordance, detecting, via the one or more input devices, a first input corresponding to a request to perform an operation associated with the first affordance, such as attention input/gaze input 528 directed toward virtual object 546b in FIG. 5E. In some embodiments, in response to detecting the first input, causing the second computer system to display the second user interface including a second affordance associated with the first affordance, such as user interface 530 of the second computer system 518 in FIG. 5E.

Alternatively or additionally to one or more of the embodiments disclosed above, in some embodiments, the change in contextual information includes a detection of an attention of a user of the first computer system, and wherein the one or more criteria includes a criterion that is satisfied when the attention of the user is directed towards the second computer system, such as attention input/gaze input 528 directed toward the second computer system 518 in FIG. 5B. In some embodiments, the computer system determines whether the attention of the user directed towards the second computer system satisfies gaze condition 308 as described herein. Alternatively or additionally to one or more of the embodiments disclosed above, in some embodiments, the change in contextual information includes a detection of an activation input at the second computer system, and wherein the one or more criteria includes a criterion that is satisfied when the attention of the activation input is detected at the second computer system, such as an activation input from hand 540 directed toward the second computer system 518 in FIG. 5D. In some embodiments, the computer system determines whether the activation input satisfies activation condition 310 as described herein. Alternatively or additionally to one or more of the embodiments disclosed above, in some embodiments, the second user interface includes one or more second affordances interactable to access one or more second functions of the second computer system and the first user interface includes one or third affordances, different from the one or more second affordances, such as user interface 530 of the second computer system 518 having one or more affordances (e.g., user interface element and/or selectable user interface objects 526a and 526b) not included in the user interface (e.g., virtual object 514) of the first computer system 500 in FIG. 5C.

Alternatively or additionally to one or more of the embodiments disclosed above, in some embodiments, prior to displaying the first user interface, detecting, by the first computer system via the one or more input devices, that the first computer system is in proximity of a point of interest and in response to detecting that the first computer system is in proximity of the point of interest, displaying, by the first computer system, the first user interface, wherein the first user interface is associated with the point of interest, such as associated with the café in FIG. 5A. Alternatively or additionally to one or more of the embodiments disclosed above, in some embodiments, causing the second computer system to display the second user interface is performed without requiring authentication of the user to the second computer system after determining that one or more criteria are satisfied.

Alternatively or additionally to one or more of the embodiments disclosed above, in some embodiments, the one or more criteria include a criterion that is satisfied when user interaction does not indicate engagement with a third application other than the first application. In some embodiments, the computer system determines whether the attention of the user interaction satisfies engagement condition 312 as described herein. Alternatively or additionally to one or more of the embodiments disclosed above, in some embodiments, after causing the second computer system to display the second user interface, detecting, via the one or more input devices, a second change in contextual information and in response to detecting the second change in contextual information, in accordance with a determination that one or more second criteria are satisfied, the first computer system displays, via the display, a third user interface that corresponds to a third session of the first application operating on the first computer system that is based at least in part on the second session of the first application operating on the second computer system, such as the first computer system displaying virtual object 548 of FIG. 5F in response to an input directed to user interface object 536 of FIG. 5E. In some embodiments, the one or more second criteria include one or more conditions described with reference to FIG. 4.

Alternatively or additionally to one or more of the embodiments disclosed above, in some embodiments, the second change in contextual information includes a detection of an activation input directed towards the second computer system, and wherein the one or more second criteria include a criterion that is satisfied when the activation input corresponds to a predetermined activation input such as finger of hand 540 directed to a selectable user interface object 536 in FIG. 5E. In some embodiments, the computer system determines whether the activation input satisfies the gesture condition 404 and/or the deactivation condition 412 as described herein. Alternatively or additionally to one or more of the embodiments disclosed above, in some embodiments, the second change in contextual information includes a detection of a second change in the relative pose between the second computer system and the reference point that is different from the first change in the relative pose between the second computer system and the reference point. In some embodiments, the computer system determines whether the second change in contextual information satisfies the movement condition 408 as described herein. Alternatively or additionally to one or more of the embodiments disclosed above, in some embodiments, the second change in contextual information includes a detection of an attention of a user of the first computer system, and wherein the one or more second criteria include a criterion that is satisfied when the attention of the user is directed away from the second computer system, such as the attention 528 directed to virtual object 546 in FIG. 5E. In some embodiments, the computer system determines whether the attention of the user of the first computer system directed away from the second computer system satisfies the gaze condition 410 as described herein.

Alternatively or additionally to one or more of the embodiments disclosed above, in some embodiments, the second change in contextual information includes a detection of an activation of a lock state of the second computer system. In some embodiments, the computer system determines whether the second change in contextual information satisfies the deactivation condition 412 as described herein. Alternatively or additionally to one or more of the embodiments disclosed above, in some embodiments, the one or more second criteria include a criterion that is satisfied when user interaction indicates engagement with the first application operating on the second computer system when detecting the second change in contextual information, such as scrolling user interface 538 with a finger of hand 540 in FIG. 5I. In some embodiments, the computer system determines whether the second change in contextual information satisfies the disengagement condition 414 as described herein. Alternatively or additionally to one or more of the embodiments disclosed above, in some embodiments, the one or more second criteria include a criterion that is satisfied when user interaction indicates lack of engagement with a third application, different than the first application, when detecting the second change in contextual information. Alternatively or additionally to one or more of the embodiments disclosed above, in some embodiments, the first computer system displays a fourth user interface that corresponds to the second session of the first application operating on the second computer system, wherein the fourth user interface provides an expanded view of the second user interface displayed by the second computer system and extends at least in part beyond a boundary of the second computer system, such as virtual object 534 in FIG. 5E.

Alternatively or additionally to one or more of the embodiments disclosed above, in some embodiments, the reference point corresponds to the first computer system, such as a location of first computer system 500 with respect to the second computer system 518. In some embodiments, the head of the user equipped with the first computer system 500 is the reference point for the first computer system and/or the second computer system. In some embodiments, the reference point is served to track the location and pose of the second computer system. Alternatively or additionally to one or more of the embodiments disclosed above, in some embodiments, the first computer system comprises a head mountable device, such as computer system 108, and the second computer system comprises a mobile phone or a tablet device, such as device 108*c* or 108*a*. Alternatively or additionally to one or more of the embodiments disclosed above, in some embodiments, the first computer system ceases to display the first user interface.

Some embodiments of the disclosure are directed to an electronic device, comprising one or more processors, memory, and one or more programs. The one or more programs are stored in the memory and configured to be executed by the one or more processors, the one or more programs including instructions for while a first computer system is in communication with a second computer system, different from the first computer system, the one or more programs further include instructions for while displaying, via the display, a first user interface that corresponds to a first session of a first application operating on the first computer system, detecting, via the one or more input devices, a change in contextual information, wherein the change in contextual information includes a first change in a relative pose between the second computer system and a reference point. The one or more programs further including instructions for: in response to detecting the change in contextual information, and in accordance with a determination that one or more criteria are satisfied, causing the second computer system to display a second user interface that corresponds to a second session of the first application operating on the second computer system based at least in part on the first session of the first application. The one or more programs further including instructions for: in accordance with a determination that the one or more criteria are not satisfied, forgoing causing the second computer system to display the second user interface of the first application.

Some embodiments of the disclosure are directed to a non-transitory computer readable storage medium storing one or more programs. The one or more programs comprising instructions, which when executed by one or more processors of an electronic device, cause the electronic device to while a first computer system is in communication with a second computer system, different from the first computer system, the instructions, which when executed by one or more processors of the electronic device, cause the electronic device to while displaying, via the display, a first user interface that corresponds to a first session of a first application operating on the first computer system, the instructions, when executed by the one or more processors of the electronic device, further cause the electronic device to detect, via the one or more input devices, a change in contextual information, wherein the change in contextual information includes a first change in a relative pose between the second computer system and a reference point. The instructions, when executed by the one or more processors of the electronic device, further cause the electronic device to in response to detecting the change in contextual information, and in accordance with a determination that one or more criteria are satisfied, cause the second computer system to display a second user interface that corresponds to a second session of the first application operating on the second computer system based at least in part on the first session of the first application. The instructions, when executed by the one or more processors of the electronic device, further cause the electronic device to in accordance with a determination that the one or more criteria are not satisfied, forgo causing the second computer system to display the second user interface of the first application.

Some embodiments of the disclosure are directed to an information processing apparatus for use in an electronic device, the information processing apparatus comprising means for while a first computer system is in communication with a second computer system, different from the first computer system, and while the information processing apparatus further comprises means for while displaying, via the display, a first user interface that corresponds to a first session of a first application operating on the first computer system, the information processing apparatus further comprises means for detecting, via the one or more input devices, a change in contextual information, wherein the change in contextual information includes a first change in a relative pose between the second computer system and a reference point. The information processing apparatus further comprising means for: in response to detecting the change in contextual information, and in accordance with a determination that one or more criteria are satisfied, the information processing apparatus further comprises means for causing the second computer system to display a second user interface that corresponds to a second session of the first application operating on the second computer system based at least in part on the first session of the first application. The information processing apparatus further comprising means for in accordance with a determination that the one or more criteria are not satisfied, means for forgoing causing the second computer system to display the second user interface of the first application.

Some embodiments of the disclosure are directed to an electronic device, comprising one or more processors, memory, and one or more programs, wherein the one or more programs are stored in the memory and configured to be executed by the one or more processors, the one or more programs including instructions for performing any of the methods disclosed above.

Some embodiments of the disclosure are directed to a non-transitory computer readable storage medium storing one or more programs, the one or more programs comprising instructions, which when executed by one or more processors of an electronic device, cause the electronic device to perform any of the methods disclosed above.

Some embodiments of the disclosure are directed to an electronic device, comprising one or more processors, memory, and means for performing any of the methods disclosed above.

Some embodiments of the disclosure are directed to an information processing apparatus for use in an electronic device, the information processing apparatus comprising means for performing any of the methods disclosed above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at a first computer system in communication with a display and one or more input devices:
    while the first computer system is in communication with a second computer system, different from the first computer system, and while displaying, via the display, a first user interface that corresponds to a first session of a first application operating on the first computer system:
        detecting, via the one or more input devices, a change in contextual information, wherein the change in contextual information includes a first change in a relative pose between the second computer system and a reference point; and
        in response to detecting the change in contextual information:
            in accordance with a determination that one or more criteria are satisfied:
                causing the second computer system to display a second user interface that corresponds to a second session of the first application operating on the second computer system based at least in part on the first session of the first application; and
            in accordance with a determination that the one or more criteria are not satisfied, forgoing causing the second computer system to display the second user interface of the first application.

2. The method of claim 1, wherein causing the second computer system to display the second user interface includes:
    while displaying the first user interface including a first affordance, detecting, via the one or more input devices, a first input corresponding to a request to perform an operation associated with the first affordance; and
    in response to detecting the first input, causing the second computer system to display the second user interface including a second affordance associated with the first affordance.

3. The method of claim 1, wherein the change in contextual information includes a detection of an attention of a user of the first computer system, and wherein the one or more criteria includes a criterion that is satisfied when the attention of the user is directed towards the second computer system.

4. The method of claim 3, wherein the change in contextual information includes a detection of an activation input at the second computer system and wherein the one or more criteria includes a criterion that is satisfied when the attention of the activation input is detected at the second computer system.

5. The method of claim 1, wherein:
the second user interface includes one or more second affordances interactable to access one or more second functions of the second computer system; and
the first user interface includes one or more third affordances, different from the one or more second affordances.

6. The method of claim 1, further comprising:
prior to displaying the first user interface, detecting, by the first computer system via the one or more input devices, that the first computer system is in proximity of a point of interest; and
in response to detecting that the first computer system is in proximity of the point of interest, displaying, by the first computer system, the first user interface, wherein the first user interface is associated with the point of interest.

7. The method of claim 1, wherein causing the second computer system to display the second user interface is performed without requiring authentication of a user to the second computer system after determining that one or more criteria are satisfied.

8. The method of claim 1, wherein the one or more criteria include a criterion that is satisfied when user interaction does not indicate engagement with a third application other than the first application.

9. An electronic device comprising:
one or more processors;
memory; and
one or more programs stored in the memory and configured to be executed by the one or more processors, the one or more programs including instructions for:
while a first computer system is in communication with a second computer system, different from the first computer system, and while displaying, via the display, a first user interface that corresponds to a first session of a first application operating on the first computer system:
detecting, via one or more input devices, a change in contextual information, wherein the change in contextual information includes a first change in a relative pose between the second computer system and a reference point; and in response to detecting the change in contextual information:
in accordance with a determination that one or more criteria are satisfied:
causing the second computer system to display a second user interface that corresponds to a second session of the first application operating on the second computer system based at least in part on the first session of the first application; and
in accordance with a determination that the one or more criteria are not satisfied, forgoing causing the second computer system to display the second user interface of the first application.

10. The electronic device of claim 9, wherein causing the second computer system to display the second user interface includes instructions for:
while displaying the first user interface including a first affordance, detecting, via the one or more input devices, a first input corresponding to a request to perform an operation associated with the first affordance; and
in response to detecting the first input, causing the second computer system to display the second user interface including a second affordance associated with the first affordance.

11. The electronic device of claim 9, wherein the change in contextual information includes a detection of an attention of a user of the first computer system, and wherein the one or more criteria includes a criterion that is satisfied when the attention of the user is directed towards the second computer system.

12. The electronic device of claim 11, wherein the change in contextual information includes a detection of an activation input at the second computer system and wherein the one or more criteria includes a criterion that is satisfied when the attention of the activation input is detected at the second computer system.

13. The electronic device of claim 9, wherein:
the second user interface includes one or more second affordances interactable to access one or more second functions of the second computer system; and
the first user interface includes one or more third affordances, different from the one or more second affordances.

14. The electronic device of claim 9, wherein the one or more programs include instructions for:
prior to displaying the first user interface, detecting, by the first computer system via the one or more input devices, that the first computer system is in proximity of a point of interest; and
in response to detecting that the first computer system is in proximity of the point of interest, displaying, by the first computer system, the first user interface, wherein the first user interface is associated with the point of interest.

15. The electronic device of claim 9, wherein causing the second computer system to display the second user interface is performed without requiring authentication of a user to the second computer system after determining that one or more criteria are satisfied.

16. The electronic device of claim 9, wherein the one or more criteria include a criterion that is satisfied when user interaction does not indicate engagement with a third application other than the first application.

17. A non-transitory computer readable storage medium storing one or more programs, the one or more programs comprising instructions, which when executed by one or more processors of an electronic device, cause the electronic device to:
while a first computer system is in communication with a second computer system, different from the first computer system, and while displaying, via the display, a first user interface that corresponds to a first session of a first application operating on the first computer system:
detect, via one or more input devices, a change in contextual information, wherein the change in contextual information includes a first change in a relative pose between the second computer system and a reference point; and
in response to detecting the change in contextual information:
in accordance with a determination that one or more criteria are satisfied:
cause the second computer system to display a second user interface that corresponds to a second session of the first application operating on the second computer system based at least in part on the first session of the first application; and in accordance with a determination that the one or more criteria are not satisfied, forgo causing the second computer system to display the second user interface of the first application.

18. The non-transitory computer readable storage medium of claim 17, wherein causing the second computer system to display the second user interface includes instructions causing the electronic device to:

while displaying the first user interface including a first affordance, detect, via the one or more input devices, a first input corresponding to a request to perform an operation associated with the first affordance; and in response to detecting the first input, cause the second computer system to display the second user interface including a second affordance associated with the first affordance.

19. The non-transitory computer readable storage medium of claim 17, wherein the change in contextual information includes a detection of an attention of a user of the first computer system, and wherein the one or more criteria includes a criterion that is satisfied when the attention of the user is directed towards the second computer system.

20. The non-transitory computer readable storage medium of claim 19, wherein the change in contextual information includes a detection of an activation input at the second computer system and wherein the one or more criteria includes a criterion that is satisfied when the attention of the activation input is detected at the second computer system.

21. The non-transitory computer readable storage medium of claim 17, wherein:

the second user interface includes one or more second affordances interactable to access one or more second functions of the second computer system; and the first user interface includes one or more third affordances, different from the one or more second affordances.

22. The non-transitory computer readable storage medium of claim 17, wherein the one or more programs comprise instructions to cause the electronic device to:

prior to displaying the first user interface, detect, by the first computer system via the one or more input devices, that the first computer system is in proximity of a point of interest; and in response to detecting that the first computer system is in proximity of the point of interest, display, by the first computer system, the first user interface, wherein the first user interface is associated with the point of interest.

23. The non-transitory computer readable storage medium of claim 17, wherein causing the second computer system to display the second user interface is performed without requiring authentication of a user to the second computer system after determining that one or more criteria are satisfied.

24. The non-transitory computer readable storage medium of claim 17, wherein the one or more criteria include a criterion that is satisfied when user interaction does not indicate engagement with a third application other than the first application.

* * * * *